United States Patent [19]
Kato et al.

[11] Patent Number: 5,966,266
[45] Date of Patent: Oct. 12, 1999

[54] CARTRIDGE TRANSFERRING ROBOT FOR LIBRARY APPARATUS, AND LIBRARY APPARATUS

[75] Inventors: Chikatsu Kato; Hiroshi Shibuya; Nobuhiko Motoyama; Keiichi Saito; Daisuke Hori, all of Kawasaki, Japan

[73] Assignee: Fujitsu Limited, Kawasaki, Japan

[21] Appl. No.: 09/021,338

[22] Filed: Feb. 10, 1998

[30] Foreign Application Priority Data

Sep. 19, 1997 [JP] Japan .................................. 9-254831

[51] Int. Cl.$^6$ .................................................. G11B 15/68
[52] U.S. Cl. ............................................................ 360/92
[58] Field of Search .................................................. 360/92

[56] References Cited

U.S. PATENT DOCUMENTS 5,258,882 11/1993 Apple et al. ............................. 360/92
5,479,581 12/1995 Kleinschnitz ........................ 360/92 X Primary Examiner—John H. Wolff
Attorney, Agent, or Firm—Greer, Burns & Crain, Ltd.

[57] ABSTRACT

A cartridge transferring robot which is capable of providing multiple functions to a hand mechanism to allow the direct insertion/extraction of a cartridge between a deck and the hand mechanism. The cartridge transferring robot according to the present invention has a hand mechanism comprising a pair of upper and lower hand members attached to a hand base to be slidable vertically, a spring for biasing the hand members in a direction of closing directions of gripping the cartridge, a pair of upper and lower cam followers attached to the hand members, a cam disposed between the cam followers for adjusting the separation between the cam followers to cause the hand members to take opening and closing actions against the biasing force of the spring, and a motor for rotationally driving the cam. This invention is applicable to a library apparatus storing a large number of cartridges such as magnetic tape cartridges and optical disk cartridges.

16 Claims, 35 Drawing Sheets

DIRECTION OF INSERTION INTO DECK

CARTRIDGE TRANSFERRING ROBOT FOR LIBRARY APPARATUS, AND LIBRARY APPARATUS

BACKGROUND OF THE INVENTION

1) Field of the Invention

The present invention relates to a cartridge transferring robot for use in a library apparatus which stores a large number of cartridges such as magnetic tape cartridges and optical disk cartridges, with the cartridge transferring robot taking the charge of the conveyance of the cartridges among a storage rack, a cartridge entry/exit station and a deck unit within the library apparatus, and further relates to a library apparatus including that cartridge transferring robot.

2) Description of the Related Art

In general, a library apparatus functions as a large-capacity external storage memory, and a storage rack in its locker stores several thousands of cartridges each accommodating, for example, a magnetic tape as a storage medium, and access such as write/read of recording/recorded data is automatically done in relation to the storage medium within each of the cartridges.

Furthermore, in addition to the aforesaid storage rack (storage unit) for storing the cartridges, the library apparatus is equipped with a station [for example, a CAS (Cartridge Access Station), a DEE (Direct Entry/Exit), and an FES (Forced Exit Station)] for carrying out the entry of the cartridges from the external into the apparatus or vice versa, a plurality of magnetic tape decks (which will be referred hereinafter to as decks) for conducting access such as write/read of recording/recorded data with respect to a storage medium (magnetic tape) within a cartridge, and a cartridge transferring robot [automatic transferring robot; which will be referred hereinafter to as an accessor (ACC)] for performing the conveyance of the cartridges among the storage rack, the cartridge entry/exit station and the decks.

In the case of such a library apparatus, on receiving an access demand to one cartridge from a host unit or the like, the accessor moves to the storage rack to search the directing cartridge and then transfers that cartridge up to the deck in a state of gripping or holding it through the use of a hand mechanism, thereby putting it into that deck. Whereupon, the deck processes the storage medium (magnetic tape) within the cartridge. The cartridge discharged from the deck after the completion of the processing is regripped by the hand mechanism of the accessor and transferred up to the storage rack by that accessor to be stored in a given location.

Each of the prior decks is provided with a cartridge delivering and receiving mechanism dedicated thereto, and an accessor inserts a cartridge into the cartridge delivering and receiving mechnaism which in turn, actually inserts or loads the same cartridge into the deck. Further, a cartridge discharged from the deck is handed over through the cartridge delivering and receiving mechanism to the accessor.

In connection with the recent increase in volume of information in computer systems, the fully automatized library apparatus as mentioned above has appeared as a means for storing information in a state of freely allowing the recording/reproduction without the need for the use of an operator, which permits the storage of a large number of cartridges. Whereas, such a library apparatus has been put on the market targeting high end users, and hence, is considerably costly. However, the market for the library apparatus tends to extend toward the middle/low end users in the future, and therefore, the development of a multi-function, low-cost and compact library apparatus for the middle/low end users is of a pressing need, and it is strongly desired to realize such a library apparatus.

SUMMARY OF THE INVENTION

The present invention has been developed with a view to eliminating these problems, and it is therefore an object of the present invention to provide a cartridge transferring robot for a library apparatus which is capable of directly conducting the insertion/extraction or entry/exit of a cartridge between a deck and a hand mechanism in a manner of giving multiple functions to the hand mechanism, thus realizing the size and cost reduction of the library apparatus, and further to provide a library apparatus having this cartridge transferring robot.

(1) For this purpose, in accordance with the present invention, in a library apparatus including a storage rack for storing cartridges each accommodating a storage medium, a cartridge entry/exit station for the entry/exit of the cartridge, and a deck for carrying out access to the storage medium within the cartridge, a cartridge transferring robot for use in the library apparatus is composed of a picker section including a hand mechanism for gripping the cartridge for insertion and extraction of the cartridge at cartridge conveyance within the library apparatus and a moving mechanism for moving the picker section up to a given position, the hand mechanism comprising a pair of upper and lower hand members made to vertically come into contact with the cartridge to grip the cartridge, a hand base to which the pair of upper and lower hand members are fitted to be vertically slidable, a biasing mechanism for biasing the pair of upper and lower hand members in closing directions of gripping the cartridge, a pair of upper and lower cam followers fitted to the pair of upper and lower hand members, respectively, a cam interposed between the pair of upper and lower cam followers for adjusting the separation between these cam followers to make the pair of upper and lower hand members take opening and closing actions while counteracting the biasing force of the biasing mechanism, and a drive mechanism for rotationally driving the cam.

Also, in accordance with this invention, a library apparatus comprises a storage rack for storing cartridges each accommodating a storage medium, a cartridge entry/exit station for the entry/exit of the cartridge, a deck for carrying out access to the storage medium within the cartridge, and a cartridge transferring robot including a picker section having a hand mechanism for gripping the cartridge for the insertion/extraction of the cartridge and a moving mechanism for moving the picker section to a given position to transfer the cartridge among the storage rack, the cartridge entry/exit station and the deck, wherein the hand mechanism of the cartridge transferring robot is composed of a pair of upper and lower hand members driven to vertically come into contact with the cartridge to grip the cartridge, a hand base to which the pair of upper and lower hand members are fitted to be vertically slidable, a biasing mechanism for biasing the pair of upper and lower hand members in closing directions of gripping the cartridge, a pair of upper and lower cam followers fitted to the pair of upper and lower hand members, respectively, a cam interposed between the pair of upper and lower cam followers for adjusting the separation between these cam followers to make the pair of upper and lower hand members take opening and closing actions while counteracting the biasing force of the biasing mechanism, and a drive mechanism for rotationally driving the cam.

In the above-described cartridge transferring robot for a library apparatus and the above-mentioned library apparatus, the cam is rotationally driven by the drive mechanism to adjust the separation between the pair of upper and lower cam followers, so that the pair of upper and lower hand members are driven to assume opening and closing actions while being subjected to the adjustment of the separation therebetween. That is, when the separation between the pair of upper and lower cam followers is enlarged by the cam, the pair of upper and lower hand members come into the open condition. For gripping the cartridge through the hand mechanism, after the hand mechanism (picker section) is moved in a state where the hand members are in this open condition so that the cartridge is put therebetween, the cam is rotationally driven by the drive mechanism. Whereupon, the pair of upper and lower hand members come into contact with the cartridge from the above and below in response to the biasing force of a spring(s), thereby gripping the cartridge.

(1-1) In this case, it is also appropriate that the cam is formed to have a cartridge gripping section for adjusting the separation between the pair of upper and lower cam followers to make the pair of upper and lower hand members take the closed condition due to the biasing force by the biasing mechanism. The cam also includes two or more hand opening sections for adjusting the separation between the pair of upper and lower cam followers to cause the pair of upper and lower hand members to take conditions with different separations against the biasing force by the biasing mechanism. The the drive mechanism rotationally drives the cam so that one of the cartridge gripping section and the two or more hand opening sections is located between the pair of upper and lower cam followers.

With the above-mentioned arrangement, in a state where the cartridge gripping section is placed between the pair of upper and lower cam followers by the drive mechanism, the pair of upper and lower hand members receive the biasing force of the biasing mechanism to come into contact with the cartridge from the above and below, thereby accomplishing the gripped cartridge.

On the other hand, when the hand opening sections are situated between the pair of upper and lower cam followers by the drive mechanism, the pair of upper and lower hand members are operated to open to make different separations therebetween depending on the respective hand opening sections. Accordingly, it is possible to change the separation between the hand members in accordance with the thickness of the cartridge, and hence to introduce various types of cartridges with different thicknesses to be gripped by the hand members.

(1-2) it is also appropriate that the cam is formed to have a cartridge gripping section with a buffer function for making the pair of upper and lower hand members take the closed condition due to the biasing force by the biasing mechanism in a state where a gap is defined between the cam and each of the cam followers. The cam also includes a hand opening section for adjusting the separation between the pair of upper and lower cam followers to cause the pair of upper and lower hand members to take the open condition against the biasing force by the biasing mechanism. The drive mechanism rotationally drives the cam so that one of the cartridge gripping section with the buffer function and the hand opening section is placed between the pair of upper and lower followers.

With this structure, in a state where the cartridge gripping section with the buffer function is located between the pair of upper and lower cam followers by the drive mechanism, since the gap is defined between the cam and the cam follower, the pair of upper and lower hand members moves vertically by a quantity corresponding to that gap (looseness) in a state of gripping the cartridge, and that gap functions as a buffer. That is, even if a positional slippage somewhat occurs between an insertion opening of the deck and the cartridge gripped by the hand mechanism, the positional slippage is absorbable by the vertical movements corresponding to the gap (looseness), which allows the cartridge to be surely inserted into the deck while utilizing the gap as a buffer.

(1-3) Furthermore, it is also possible that the cam is made to have, as a lock section, a lock groove allowed to engage with the lower cam follower to fix the pair of upper and lower hand members to the hand base in a state of gripping the cartridge, and is rotationally driven by the drive mechanism so that one of the cartridge gripping section with the buffer function, the hand opening section and the lock section is disposed between the pair of upper and lower cam followers.

Whereupon, in a state where the lock section is disposed between the pair of upper and lower cam followers by the drive mechanism, the lower cam follower is fitted in the lock groove so that the pair of upper and lower hand members are fixed to the hand base in a state of gripping the cartridge.

(1-4) Still further, the cam can be formed to have, as a lift-up section, a lift-up groove allowed to engage with the lower cam follower to forcibly lift up the pair of upper and lower hand members in a state of gripping the cartridge, and rotationally driven by the drive mechanism so that one of the cartridge gripping section with the buffer function, the hand opening section, the lock section and the lift-up section is placed between the pair of upper and lower cam followers.

Thus, when the lift-up section is placed between the pair of upper and lower cam followers by the drive mechanism, the lower cam follower is fitted in the lift-up groove to forcedly lift up the pair of upper and lower hand members in a state of gripping the cartridge.

(1-5) Moreover, the biasing mechanism can be made up of a first spring interposed between the lower hand member and the hand base for upwardly biasing the lower hand member, and a second spring placed between the upper hand member and the hand base for downwardly biasing the upper hand member.

With this structure, when the cartridge gripping section with the buffer function is placed between the pair of upper and lower cam followers by the drive mechanism to define a gap between the cam and the cam follower, through the biasing forces of the first and second springs, the cartridge gripped by the hand mechanism is retainable at a substantially central portion in the vertical movement range due to the aforesaid gap (looseness).

(2) On the other hand, in accordance with this invention, a cartridge transferring robot for a library apparatus which is the same as that mentioned above is equipped with a picker section having a hand mechanism for gripping a cartridge for the insertion/extraction of the cartridge and for transferring the cartridge within the library apparatus. It is further equipped with a moving mechanism for moving the picker section to a given position, wherein the hand mechanism includes a mounter mechanism for applying a pressing force to the cartridge to insert the cartridge into the deck. The mounter mechanism comprises a mounter arm provided to be movable in a direction of coming into contact with an end surface of the cartridge to push the cartridge into the deck, a pinion geared with a rack formed on the mounter arm, and a rotational drive mechanism for rotating the pinion to move the mounter arm in the aforesaid direction.

Furthermore, in a library apparatus according to this invention, a hand mechanism of a cartridge transferring robot to be used therein is provided with a mounter mechanism for applying a pressing force to a cartridge to insert the cartridge into a deck. This mounter mechanism comprises a mounter arm provided to be movable in a direction of coming into contact with an end surface of the cartridge to push the cartridge into the deck, a pinion geared with a rack formed on the mounter arm, and a rotational drive mechanism for rotating the pinion to move the mounter arm in the aforesaid direction.

In the foregoing cartridge transferring robot for a library apparatus and the aforesaid library apparatus according to this invention, in inserting the cartridge into the deck, the cartridge is conveyed through the hand mechanism up to the cartridge insertion opening of the deck, and after the hand mechanism is driven to open, the pinion is rotationally driven by the rotational drive mechanism to move the mounter arm through the pinion and the rack geared with this pinion in the direction of pushing the cartridge. Thus, the cartridge is inserted into the depth of the deck while being pressed by the mounter arm.

(2-1) The mounter mechanism can also be equipped with a buffer mechanism for, in case that a pressing force exceeding a given load works on the cartridge, absorbing the extra or overplus pressing force. In this case, the buffer mechanism can be constructed by placing a resin-made bearing or a resin-made spacer between the pinion and a drive shaft on the rotational drive mechanism side.

With the above-mentioned structures, if a pressing force above a given load is applied onto the cartridge, the buffer mechanism absorbs the extra pressing force. For instance, slip takes place through the resin bearing or the resin spacer between the pinion and the drive shaft on the rotational drive mechanism side, and the frictional force produced at that time absorbs the extra pressing force, which can prevent an excessive pressing force from being applied onto the cartridge.

(2-2) In addition, a bush can be provided to supporting the mounter arm so that the mounter arm is movable in the direction of pushing the cartridge into the deck, with this bush being constructed as an oil retaining bush. Further, the mounter arm can have a looseness controlling groove made along the aforesaid direction and can be equipped with a looseness controlling metallic member which is made to engage with the looseness controlling groove to guide the mounter arm. Whereupon, smooth direct-advancing movements of the mounter arm become possible. Further, employing the oil retaining bush ensures smoother linear movements of the mounter arm.

(3) Moreover, in accordance with this invention, a cartridge transferring robot for a library apparatus which is the same as that mentioned above is equipped with a picker section having a hand mechanism for gripping a cartridge for the insertion/extraction of the cartridge and for transferring the cartridge within the library apparatus and further equipped with a moving mechanism for moving the picker section to a given position, and is characterized in that a first sensor is provided to detect that a cartridge is put in between a pair of upper and lower hand members constituting the hand mechanism and further a second sensor is provided to detect that an end surface of the cartridge reaches a given position after the first sensor detects that the cartridge is put therebetween.

Furthermore, a library apparatus according to this invention is characterized in that a cartridge transferring robot to be used therein is provided with a first sensor for detecting that a cartridge is put in between a pair of upper and lower hand members constituting the hand mechanism and a second sensor for detecting that an end surface of the cartridge reaches a given position after the first sensor detects that the cartridge is put therebetween.

In the foregoing cartridge transferring robot for a library apparatus and the aforesaid library apparatus according to this invention, in a state where the detection result by the first sensor shows that the cartridge exists between the pair of upper and lower hand members, the second sensor can sensitively detect the fact that the end surface of the cartridge arrives at the given position.

The cartridge transferring robot for a library apparatus and the library apparatus according to this invention can provide the following effects and advantages.

1) The cam is rotationally driven by the drive mechanism to adjust the separation between the pair of upper and lower cam followers, so that the pair of upper and lower hand members are driven to take opening and closing actions while the separation therebetween is adjusted. Accordingly, it is possible to create the opening and closing mechanism for the hand members with an extremely simple and compact arrangement, which contributes to the size and cost reduction of the library apparatus. In addition, since the hand members are capable of gripping various types of cartridges having different thickness, a library apparatus is realizable which stores a plurality of types of cartridges existing by mixture.

2) In a manner that the buffer function given cartridge gripping section of the cam is located between the pair of upper and lower cam followers, even if a positional slippage takes place somewhat between the cartridge insertion opening of the deck and the cartridge gripped by the hand mechanism, that positional slippage is absorbed by the vertical movements corresponding to the gap defined between the cam follower and the cam. That is, by using that gap as a buffer, it is possible to surely insert the cartridge into the deck, with the result that there is no need to provide a cartridge delivering and receiving mechanism at every deck, which allows the size and cost reduction of the library apparatus.

3) In case where a demand is made to slightly lift up the cartridge in a state of gripping the cartridge by the pair of upper and lower hand members, the lock section of the cam is placed between the pair of upper and lower cam followers, so that the pair of upper and lower hand members can be fixed to the hand base while gripping the cartridge, with the result that it is possible to inhibit the hand mechanism from vertically moving due to the looseness, and hence to certainly lift up the cartridge.

4) When a demand is made to slightly lift up the cartridge while gripping the cartridge by the pair of upper and lower hand members as mentioned above, the lift-up section of the cam is placed between the pair of upper and lower cam followers, so that the pair of upper and lower hand members are forced to rise in a state of gripping the cartridge, with the result that it is possible to certainly perform the operations such as releasing from the engaging condition between the cartridge and the lock member in the storage rack.

5) Now that, due to the biasing forces of the first and second springs, the cartridge gripped by the hand mechanism is held at the substantially central portion in the vertical movement range resulting from the gap (looseness), the absorption of the positional slippage is surely and effectively achievable at the insertion of the cartridge into the deck.

6) Now that the cartridge is pressed by the mounter arm of the mounter mechanism in a given direction when being inserted into the deck, the insertion into the depth of the deck is surely achievable. Accordingly, the necessity for the cartridge delivering and receiving mechanism to be provided at every deck is eliminable, thus contributing to the size and cost reduction of the library apparatus.

7) In the case where an excessive pressing force works on the cartridge at the pushing operation by the mounter mechanism, the extra pressing force is absorbed by the buffer mechanism (the frictional force due to the slip of a resin bearing or resin spacer), thereby preventing the excessive pressing force from being applied onto the cartridge. Therefore, even if an excessive load works on the cartridge, it is possible to protect not only the cartridge and the peripheral portions, but also the mounter mechanism and the drive system therefor.

8) Owing to using the bush (oil retaining bush) or the looseness controlling groove/the looseness controlling metallic member, the direct-advancing movements of the mounter arm can be smoothly made to prevent the mounter arm from being unsteady, with the result that the occurrences of troubles are certainly avoidable, for example, the sensor flag and the sensor attached to the mounter mechanism are prevented from interfering with each other.

9) Since the second sensor can sensitively detect that the end surface of the cartridge reaches a given position on the condition that the detection result by the first sensor shows that the cartridge exists between the pair of upper and lower hand members, the hand mechanism can certainly catch the cartridge discharged from the deck, which permits the elimination of the need for installing a cartridge delivering and receiving mechanism at every deck, thus contributing the size and cost reduction of the library apparatus.

10) As described above, by providing multiple functions to the hand mechanism, the insertion/extraction of the cartridge is directly achievable between the deck and the hand mechanism without the need for placing a cartridge delivering and receiving mechanism therebetween, which allows the size and cost reduction of the library apparatus, and which realizes a library apparatus in which a plurality of types of cartridges exist by mixture.

DESCRIPTION OF THE PREFERRED EMBODIMENTS

An embodiment of the present invention will be described hereinbelow with reference to the drawings.

[1] Description of Entire Arrangement of Library Apparatus

Figure 2:
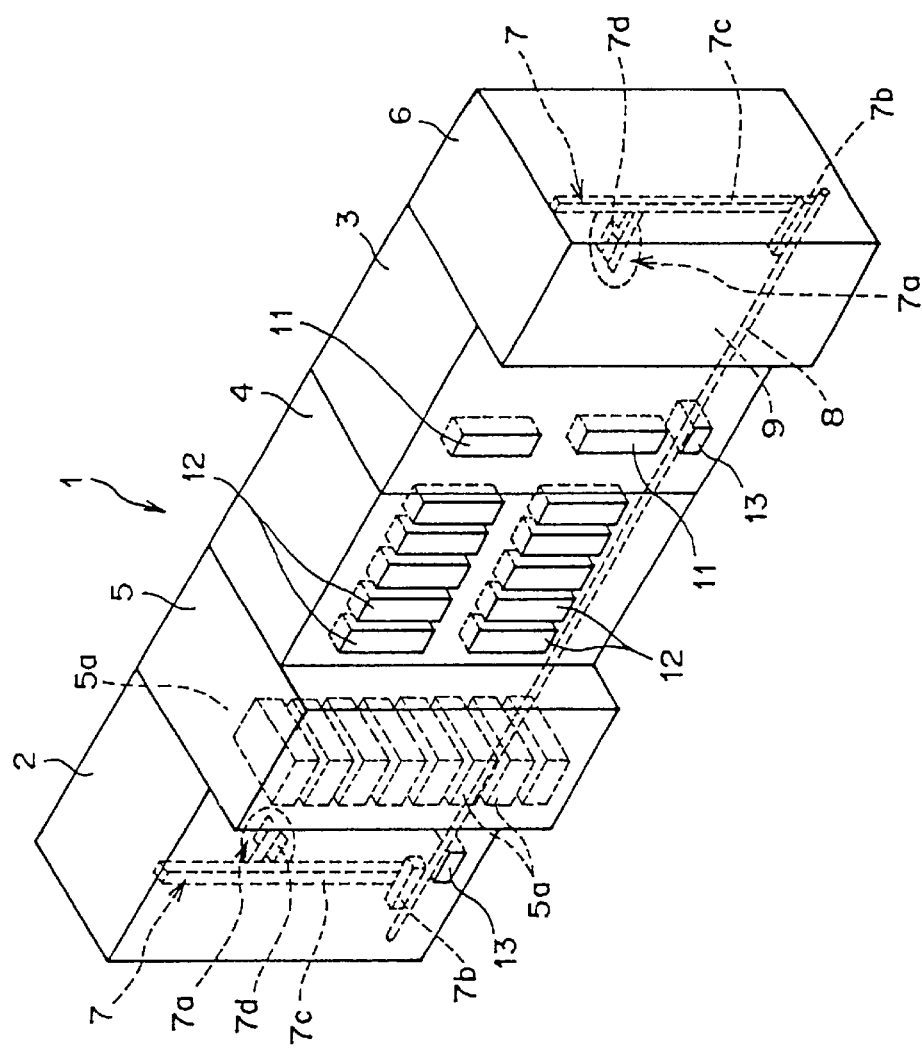
FIG. 2 is a perspective view illustratively showing the whole structure of a library apparatus to which the embodiment of this invention is applicable.

FIG. 2 is a perspective view illustratively showing the entire construction of a library apparatus to which this embodiment is applicable. As shown in FIG. 2, a library apparatus 1 to which this embodiment is applicable stores a large number of magnetic tape cartridges 10 (see FIGS. 9 and 10; cartridges each accommodating a magnetic tape as a storage medium) and conducts access such as write/read of recording/recorded data in relation to each of the magnetic tape cartridge 10.

The library apparatus 1 is composed of, for example, left and right accessor units (which will be referred hereinafter to as LAU, RAU, respectively) 2, 3, a cartridge storage unit (which will be referred hereinafter to as a CSU) 4, a tape drive mount unit (which will be referred hereinafter to as a TMU) 5, and an accessor extend unit (which will be referred hereinafter to as an AEU) 6, which are in a connected relation to each other. Also included in the apparatus 1 are cartridge transferring robots (automatic conveying robot; which will be referred hereinafter to as accessors) 7 which are located on the left and right sides, respectively, and which move within these units 2 to 6 to transfer the cartridge 10.

The LAU 2 and RAU 3 function as garages for the accessors 7, respectively, and on the front side of the RAU 3 (the external space side, that is, the side where the operator operates the apparatus) there are provided a pair of upper and lower cartridge entry/exit stations [each of which will be referred hereinafter to as a CAS (Cartridge Access Station)] 11, 11 for carrying out the entry or exit of the cartridge into or from the library apparatus 1 and a cartridge forced exit station (FES) 13 for forcedly discharging a defective cartridge to the external. In addition, another FES 13 is placed on the front side of LAU 2.

The CSU 4 stores a large number of cartridges 10, and in the embodiments of this invention, five cartridge direct entry/exit stations (each of which will be referred hereinafter to as a DEE) 12 are set on the upper side and five DEEs 12 on the lower side, ten in total. In each of the DEEs 12, a magazine (not shown) storing a plurality of cartridges 10 is set in order to permit the simultaneous entry or exit of the plurality of cartridges 10 into or from the library apparatus 1.

Furthermore, a storage rack (not shown) having a large number of cells for storing a large number of cartridges is placed on an inner wall surface of each of the LAU 2, RAU 3 and CSU 4, and the cartridge 10 from the CAS 11 or the DEE 12 is stored in a given cell of the storage rack through the use of the accessor 7.

The TMU 5 has a plurality of (6 in FIG. 2) magnetic tape decks (which will be referred hereinafter to as decks) 5a, and each of the decks 5a conducts the write/read processing of recording/recorded data onto/from a magnetic tape within the cartridge 10 transferred by each of the accessors 7.

The AEU 6 includes a power source (not shown) for supply of an operating power to each of the accessors 7 and a controller (not shown) for control of the accessors 7.

These units 2 to 6 are in a coupled relation to each other and disposed in a state where their rear surfaces (the sides opposite to the above-mentioned front side) are brought into contact with a wall surface or the like, and organize the library apparatus 1. Further, formed in the library apparatus 1 is an operating space (accessor passage) 9 for the accessors 7 which penetrates the units 2 to 6, and placed on the bottom surface of this operating space 9 is a rail (X rail) 8 for guiding the respective accessors 7, which allows each of the accessors 7 to move within the operating space 9.

In addition to a hand mechanism 7d (see FIGS. 15 to 44C) for holding the cartridge 10 to perform the insertion/extraction thereof, each of the accessors 7 involves a carriage 7b movable in the horizontal directions along the X rail 8 for moving a hand assembly 7a including this hand mechanism 7d up to a given position and a vertical column 7c for vertically guiding the hand assembly 7a on the carriage 7b, which constitute a moving mechanism. This invention relates to this accessor 7, and a structure and operation thereof will be described herein later with reference to FIGS. 1 and 3 to 44C.

In the library apparatus 1 thus constructed, the cartridge 10 from the CAS 11 or the DEE 12 is gripped and taken out by the hand mechanism 7d of the accessor 7 and is inserted into and stored in a given cell of the storage rack after being carried through the operating space 9 by the accessor 7.

Furthermore, of a large number of cartridges 10 stored in the respective cells of the storage rack, a cartridge(s) 10 specified by a host unit is gripped and pulled out by the hand mechanism 7d of the accessor 7 and then transferred by the accessor 7 through the operating space 9 to the deck 5a of the TMU 5 to be inserted thereinto.

In the deck 5a, after the recording/reproduction processing on/from the magnetic tape housed in the cartridge 10, the cartridge 10 staying within the deck 5a is discharged therefrom and gripped and taken out by the hand mechanism 7d of the accessor 7 and subsequently inserted into and stored in a given cell of the storage rack by the accessor 7 after passing through the operating space 9.

Incidentally, for discharging the cartridge(s) 10 stored in the storage rack to the exterior of the library apparatus 1, the cartridge 10 to be discharged is gripped by the hand mechanism 7d of the accessor 7 to be taken out from the storage rack and then transferred through the operating space 9 to the CAS 11 or the DEE 12 by the accessor 7 to be inserted into a given position (cell) of the CAS 11 or the DEE 12.

[2] Description of Entire Arrangement of Accessor

Figure 3:
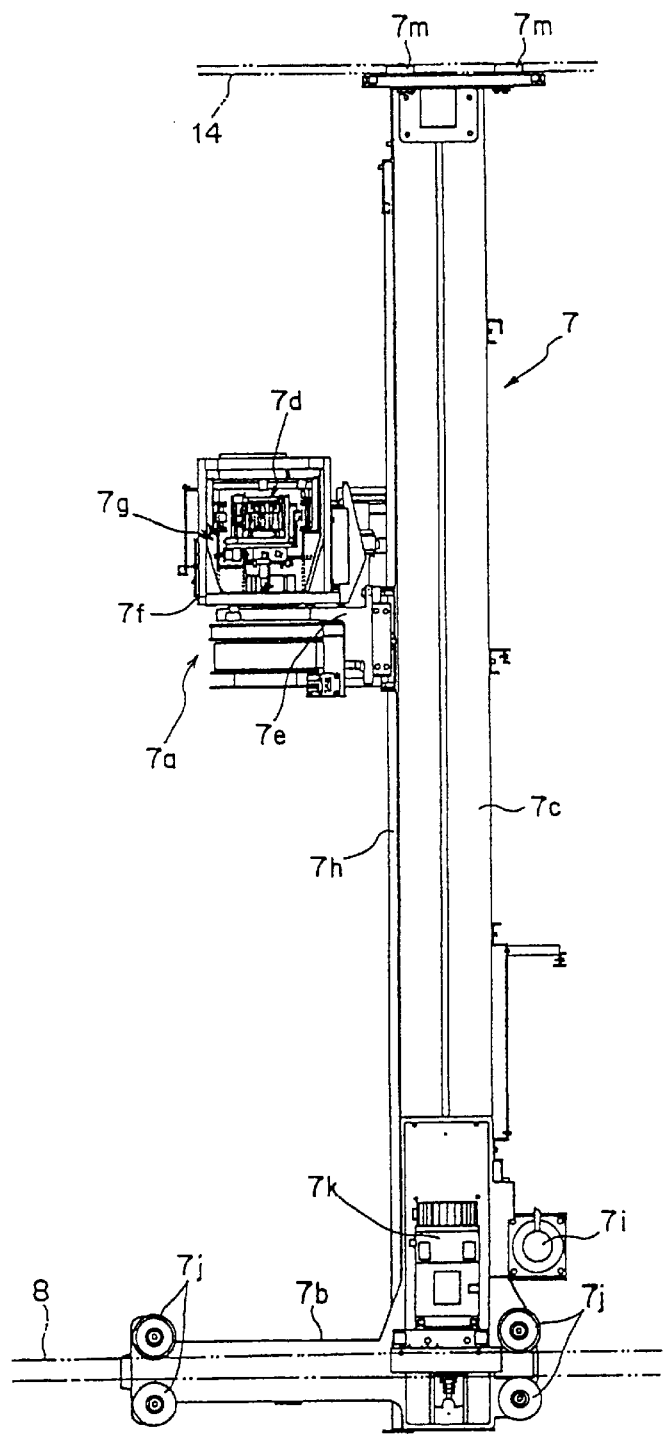
FIG. 3 is a front elevational view showing an accessor in this embodiment of this invention.

FIG. 3 is a front elevational view showing the accessor 7 in the embodiments of this invention. As shown in FIG. 3, the accessor 7 is, as mentioned before, composed of the hand assembly 7a including the hand mechanism 7d, the carriage 7b and the vertical column 7c.

The hand assembly 7a is constructed in such a manner as to place a picker section 7g including the hand mechanism 7d through a tilt base 7f on a supporting base 7e. The detailed structure thereof will be described herein later.

The supporting base 7e making up the hand assembly 7a is attached to the vertical column 7c to be allowed to slide up and down while being guided by a guide rail 7h fixed vertically along the vertical column 7c. In addition, the supporting base 7e is coupled to a belt (not shown; a belt wound around a pair of pulleys built in upper and lower locations of the vertical column 7c). When this belt is rotationally driven by an elevating drive motor 7i, the supporting base 7e, that is, the whole hand assembly 7a, is vertically shifted to be positioned at a given height.

The carriage 7b is integrally connected to a lower end side of the vertical column 7c and is made to travel along the X rail 8 while supporting the vertical column 7c. Onto the front and rear sides of this carriage 7b, there are pivotally fitted two sets (two pairs) of traveling rollers 7j, 7j each set of which are situated to vertically sandwich the X rail 8 therebetween to be rotatable in accordance with the traveling of the carriage 7b.

Furthermore, the X rail 8 is equipped with a traveling drive rack (not shown) made to extend in its longitudinal directions. In addition, the carriage 7b is provided with a pinion (not shown) rotationally driven by a traveling drive motor 7k.

Still further, a top rail 14 is laid in an upper section of the operating space 9 of the accessor 7 to extend in parallel to the X rail 8. In addition, on the upper end side of the vertical column 7c, there are pivotally fitted two sets (two pairs) of guide rollers 7m, 7m which are situated on the front and rear sides to horizontally sandwich the top rail 14 therebetween to be rotatable in accordance with the traveling of the carriage 7b.

Thus, when the traveling drive motor 7k rotationally drives the pinion, the accessor 7 is wholly moved along the X rail 8 while the pinion and the traveling drive rack gear with each other. Further, when the elevating drive 7i revolves the aforesaid belt, the hand assembly 7a is wholly moved up and down along the vertical column 7c. Consequently, the hand assembly 7a (the picker section 7g including the hand mechanism 7d) is shifted up to a given position within a plane including the X rail 8 and the vertical column 7c and positioned thereat.

[3] Description of Hand Assembly

Figure 4:
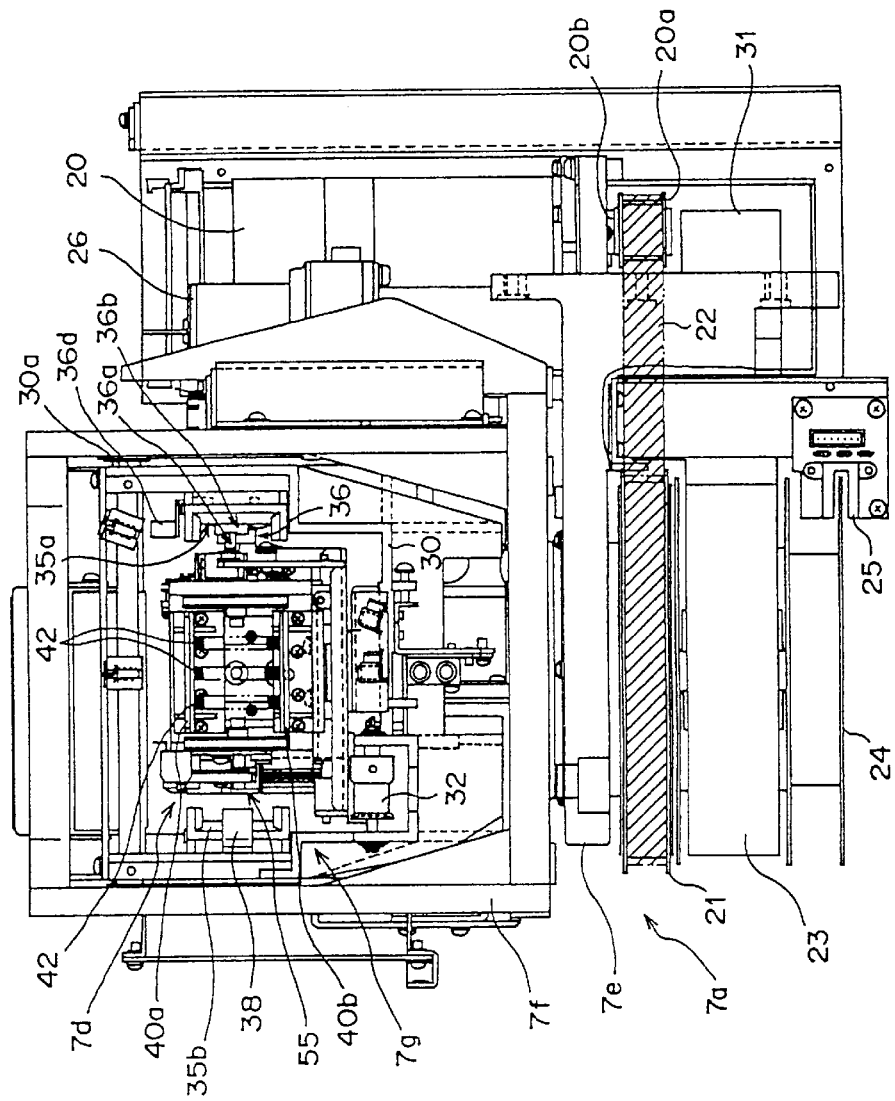
FIGS. 4 and 5 are respectively a front elevational view and a plan view showing a hand assembly of the accessor in this embodiment.
Figure 5:
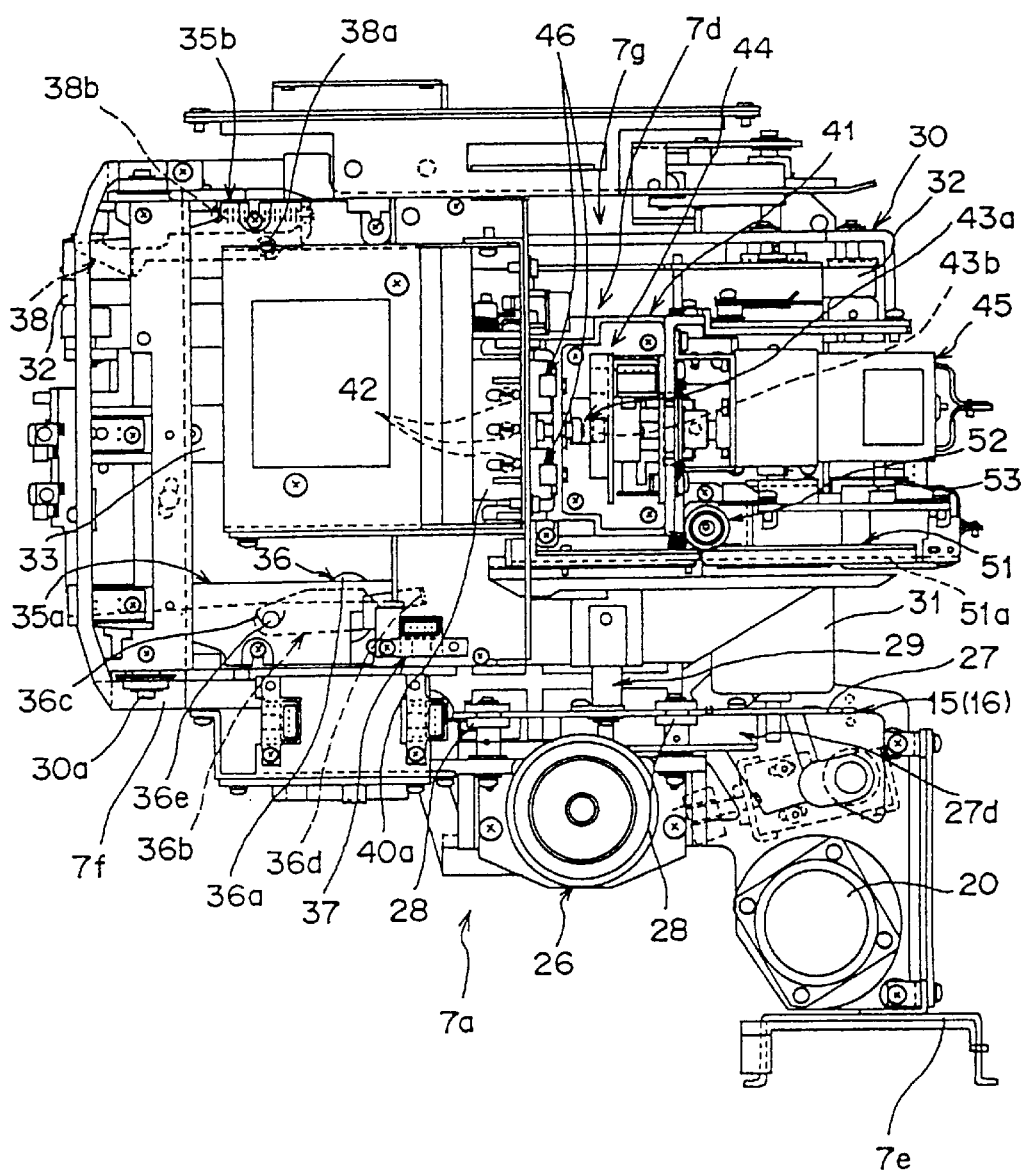

FIGS. 4 and 5 are front elevational and plan views showing the hand assembly 7a of the accessor 7 in this embodiment. As shown in FIGS. 4 and 5, in that hand assembly 7a, the hand mechanism 7d is mounted on the picker section 7g (a picker base 30) to be movable in the forward and backward directions, and as will be described herein later with reference to FIGS. 6 to 10, the hand mechanism 7d is driven by a servo motor 31 and a timing belt 32 to slide in the forward and backward directions (the left- and right-hand directions in FIG. 5) along an LM guide 33.

The picker section 7g (picker base 30) is swingably fitted to the tilt base 7f and is swingingly driven around a supporting shaft (rotary shaft) 30a through a swinging drive mechanism 16 comprising a tilt motor 26, a plate cam 27 and a guide roller 28 located on the supporting base 7e side and a cam follower 29 situated on the picker section 7g side. A tilt mechanism 15 comprising the aforesaid tilt base 7f and swinging drive mechanism 16 will be described in detail later with reference to FIGS. 11 to 14.

Furthermore, the tilt base 7f is fitted with respect to the supporting base 7e to be revolvable, and driven through a revolving drive motor 20, a pulleys 20a, 21 and a timing belt 22 to revolve around its vertical shaft.

More specifically, the revolving drive motor 20 is fixedly secured to the supporting base 7e side in a state where a driven shaft 20b is disposed vertically, and the pulley 20a fitted over the driven shaft 20b is rotationally driven around its vertical shaft. Further, the tilt base 7f is supported by the supporting base 7e to be revolvable around its vertical shaft, and the pulley 21 is fitted to the tilt base 7f to be coaxial with its revolving shaft. In addition, the timing belt 22 is wound around the pulleys 20a and 21.

Accordingly, in a manner that the revolving drive motor 20 rotationally drives the pulley 20a, the rotational drive force of the motor 20 is transmitted through the timing belt 22 and the pulley 21 to the tilt base 7f which in turn, is driven to be revolved around its vertical shaft together with the picker section 7g and the hand mechanism 7d.

Moreover, provided below the pulley 21 is a cable casing 23, and further fitted below it is a disc 24 with a slit for rotational position detection which rotates integrally with the pulley 21 and the tilt base 7f.

In the cable casing 23, a cable (not shown) for transmission and reception of various signals and a power supply between the supporting base 7e side and the tilt base 7f side is put spirally with respect to its revolving shaft to be revolvable therein.

The disc 24 with the slit is disposed to pass through the position of a photosensor 25 fixed on the supporting base 7e side, so that the photosensor 25 can detect the slit (not shown) of the disc 24, which allows the detection of the revolved position of the tilt base 7f, i.e., the direction of the picker section 7g (hand mechanism 7d).

As shown in FIGS. 4 and 5, in addition to the aforesaid picker base 30, servo motor 31, timing belt 32 and LM guide 33, the picker section 7g is equipped with a cartridge discrimination actuator 36 comprising a pair of left- and right-hand guide members 35a, 35b, a roller 36a, an arm 36b, a coil spring 36c, a flag 36d and a rotary shaft 36e, and further provided with a photosensor 37, and a claw (locking member) 38 swingable around a rotary shaft 38a and biased by a spring 38b. The detailed description thereof will be made herein later with reference to FIGS. 6 to 10.

In addition, as shown in FIGS. 4 and 5, the hand mechanism 7d is provided with a mounter mechanism 50 comprising a pair of upper and lower hand members 40a, 40b, a hand base 41, springs 42, a pair of upper and lower cam followers 43a, 43b, a cam 44, a hand opening and closing drive motor 45, linear ways 46, a mounter arm 51 with a rack 51a, a pinion 52 and a mounter arm drive motor 53, and further equipped with a CIP/CSP unit 70. This hand mechanism 7d partially constitutes the feature of this invention, and will be described herein later in detail with reference to FIGS. 1 and 15 to 44C.

[4] Description of Picker Section

Figure 6:
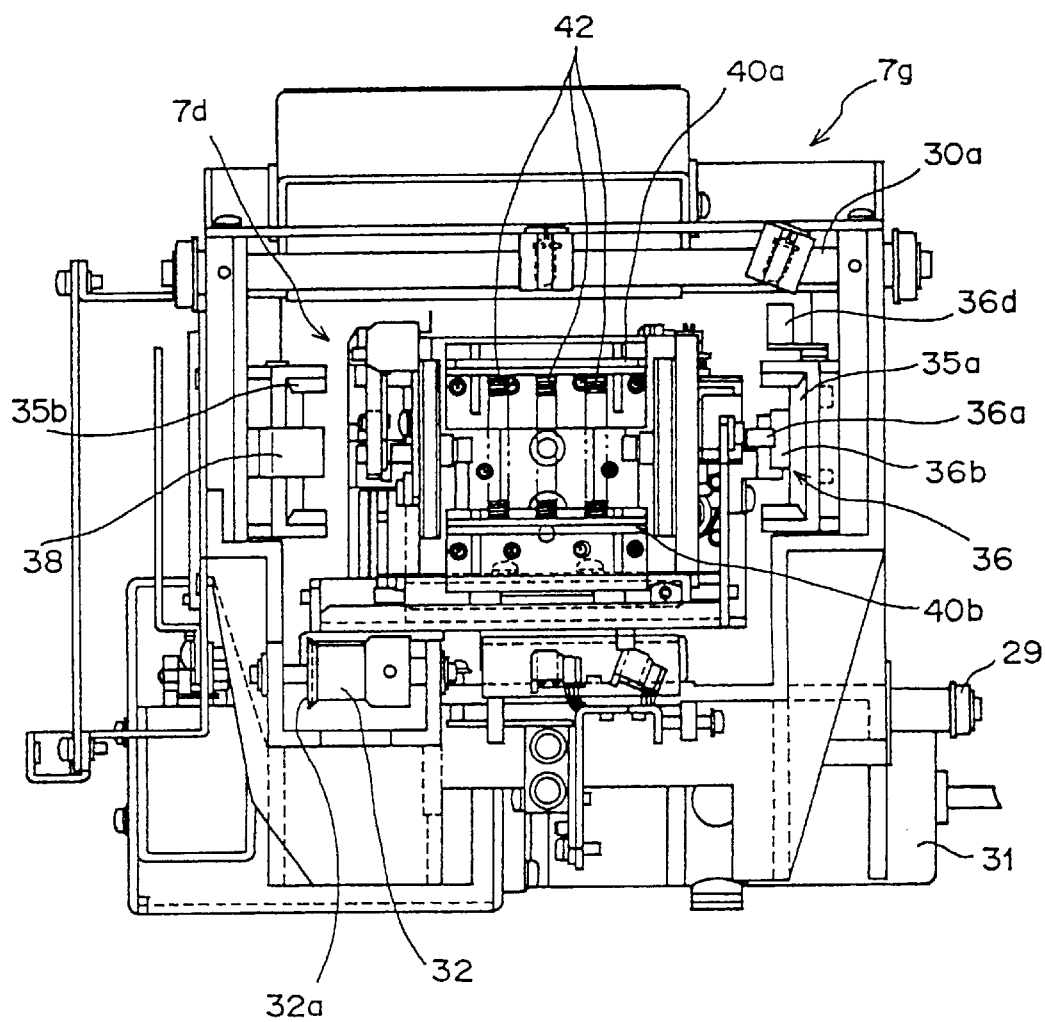
FIGS. 6, 7 and 8 are respectively a front elevational view, plan view and a side elevational view showing a picker section of the accessor in this embodiment.
Figure 7:
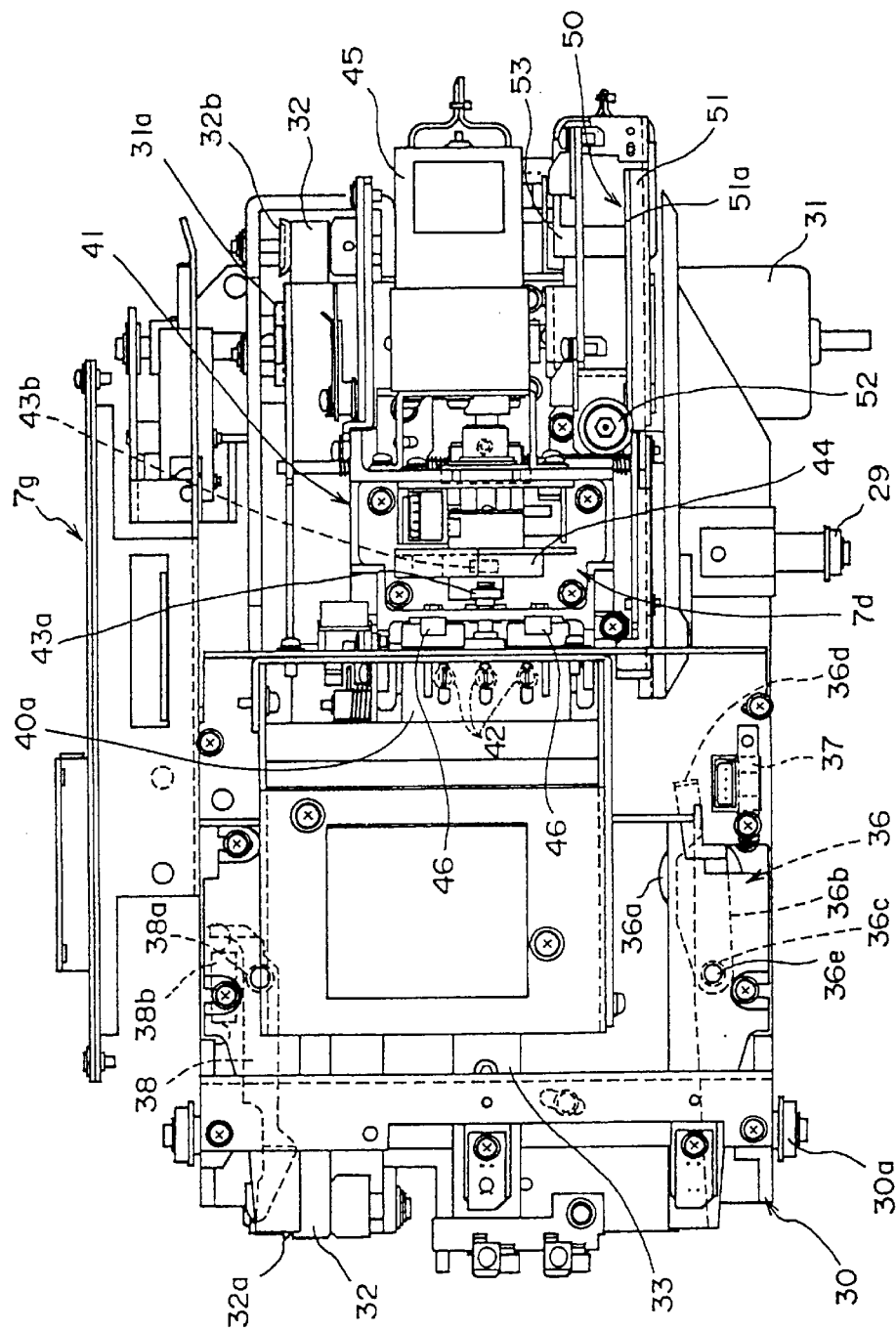
Figure 8:
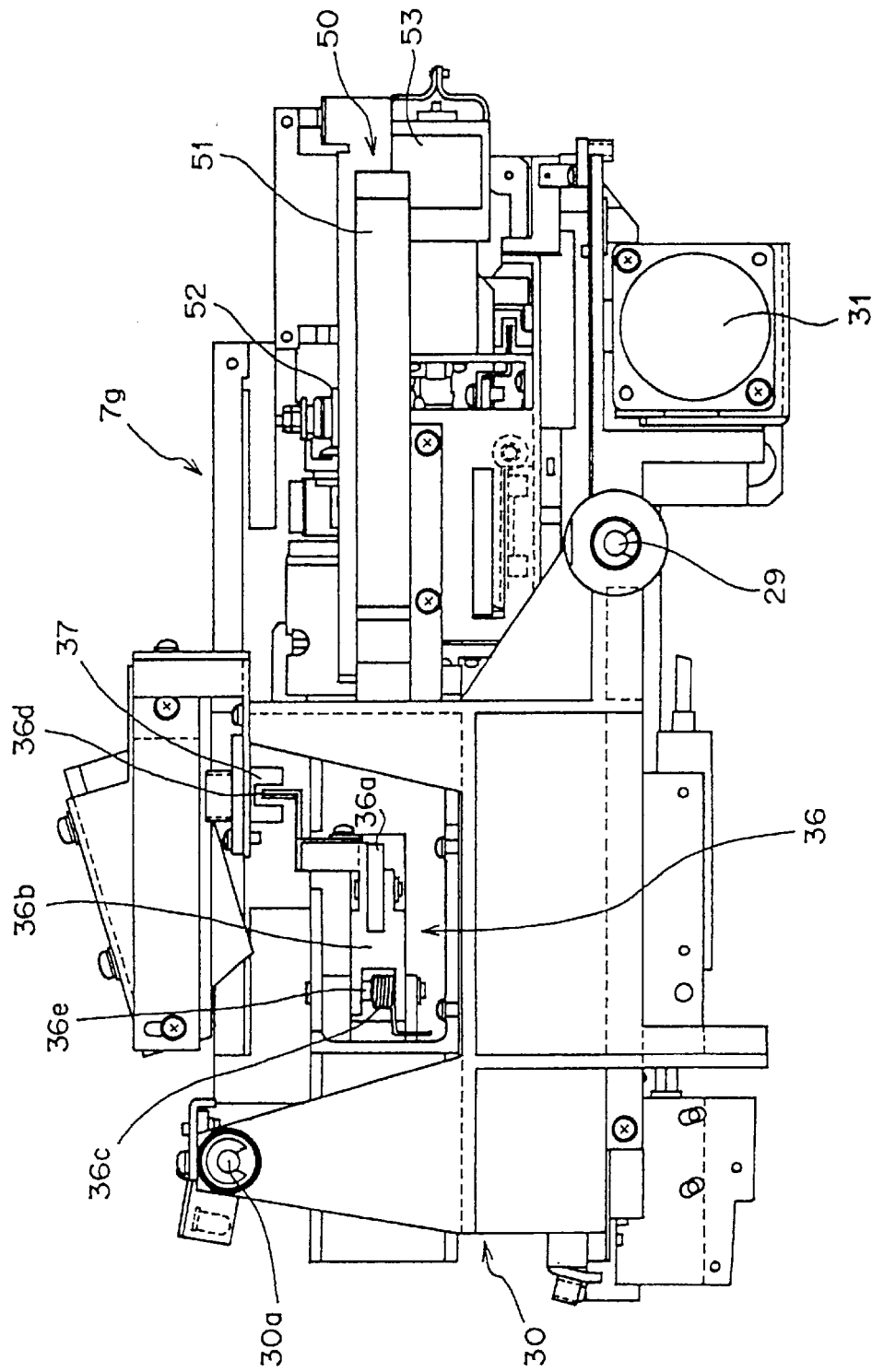
Figure 9:
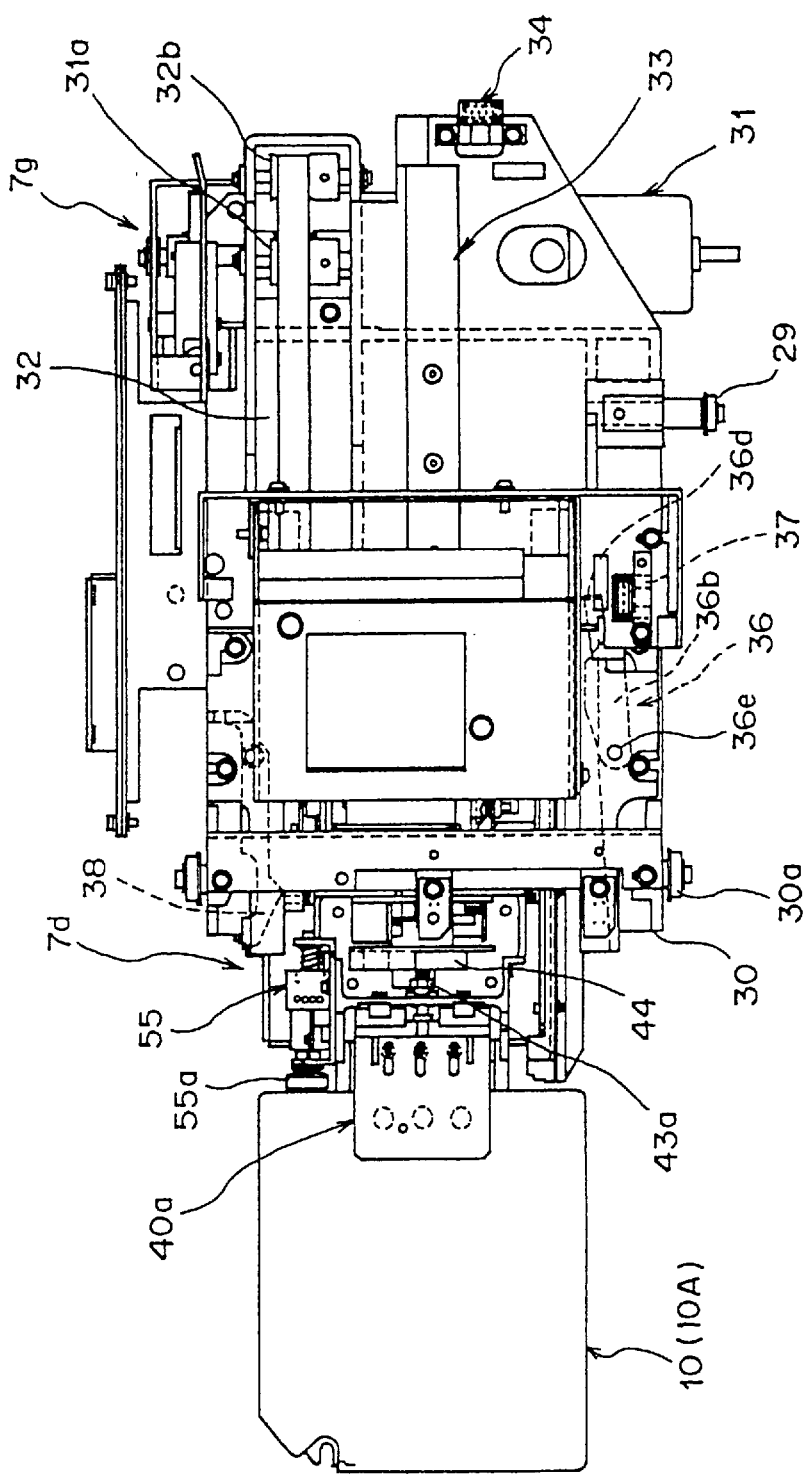
FIGS. 9 and 10 are respectively a plan view and a side elevational view showing an advancing state of a hand mechanism of the picker section of the accessor in this embodiment.
Figure 10:
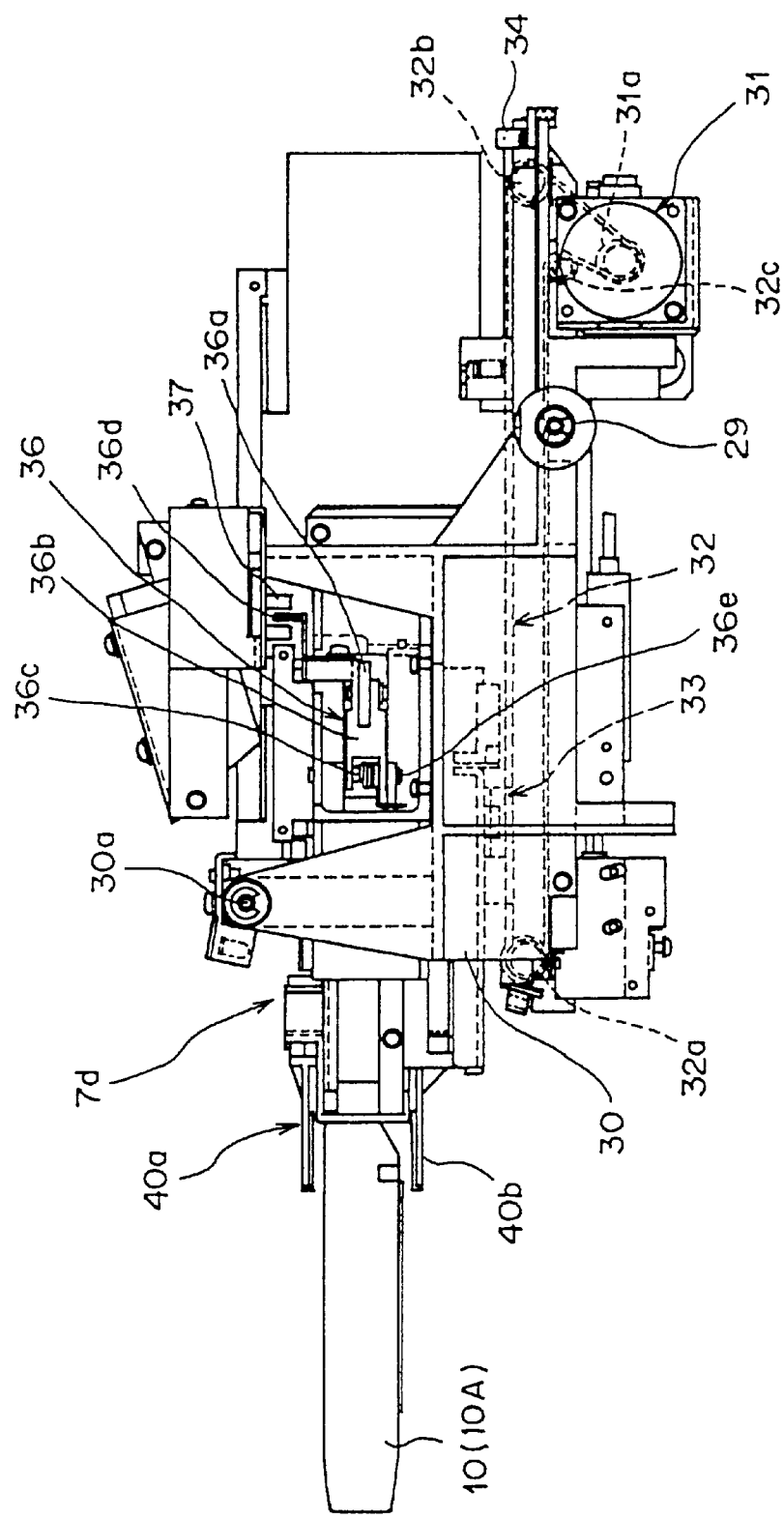

FIGS. 6 to 10 are illustrations of the picker section 7g of the accessor 7 according to this embodiment, and of these drawings, FIG. 6 is a front elevational view of the picker section 7g, FIG. 7 is a plan view thereof, FIG. 8 is a side elevational view thereof, and FIGS. 9 and 10 are respectively plan and side elevational views showing the advanced condition of the hand mechanism 7d of the picker section 7g. In these illustrations, the reference numerals being the same as those in the above description represent the same or substantially same parts.

As shown in FIGS. 6 to 8, the hand mechanism 7d is mounted in the picker section 7g to be movable in the forward and backward directions, and is driven by the servo motor 31 and the timing belt 32 to slide in the forward and backward directions (left- and right-hand directions in FIG. 8) along the LM guide 33.

More specifically, the hand base 41 of the hand mechanism 7d is connected with the timing belt 32, and as shown in FIGS. 6, 7, 9 and 10, the timing belt 32 is wound around the pulleys 32a, 32b disposed on the front and rear sides of the picker base 30 and the pulley 31a connected to a drive shaft (not shown) of the servo motor 31, and guided with a guide roller 32c.

Accordingly, when the timing belt 32 is revolved by the servo motor 31, the hand base 41, that is, the whole hand mechanism 7d, is moved in the backward or forward direction to take either the retracted condition (retreated position) shown in FIGS. 6 to 8 or the cartridge 10 delivering and receiving condition (advanced position) shown in FIGS. 9 and 10.

Incidentally, to the rear end portion of the picker base 30, there is fitted a picker home sensor (photosensor) 34 which detects that the hand mechanism 7d is retracted up to the home position (retreated position).

On the other hand, in this embodiment, for treating a plurality of types of cartridges 10 within the library apparatus 1, a type identifying mechanism is placed in the picker section 7g to identify or discriminate the type of the cartridge 10 held in the picker section 7g in a state of being gripped by the hand mechanism 7d, and as will be described later, the type identifying mechanism is made up of an actuator 36 and a photosensor 37.

Furthermore, the picker section 7g is provided with a pair of left- and right-hand guide members 35a, 35b, which are for guiding the cartridge 10 to be led into the picker section 7g in a state of being gripped by the hand mechanism 7d while holding the same cartridge 10 from both sides. The separation between these paired left and right guide members 35a, 35b is set to be slightly larger than the largest of a plurality of types of cartridges 10.

Furthermore, in this embodiment, the type identifying mechanism is composed of an actuator 36 made to move in accordance with the irregularity (variation in height) of one side surface of the cartridge 10 held in the picker section 7g, a photosensor 37 serving as a detection section for detecting the quantity of movements of this actuator 36, and an identifying section (not shown; a control CPU for taking the charge of control of the operation of the accessor 7) for identifying the type of the cartridge 10 on the basis of the movement quantity of the actuator 36 detected by the photosensor 37.

In this embodiment, the actuator 36 is located on one guide member 35a side and is, as mentioned before, composed of the roller 36a, the arm 36b, the coil spring 36c, the flag 36d and the rotary shaft 36e.

In this case, the roller 36a is disposed to protrude from the guide member 35a toward the cartridge side, and is made to rotate around a shaft perpendicular to the traveling plane of the cartridge 20 while coming into contact with one side surface of the cartridge 10. The arm 36b pivotally supports the roller 36a, and is fitted to the picker section 7g to be swingable around the rotary shaft 36e normal to the traveling plane of the cartridge 10 to swing in accordance with the irregularity of one side surface of the cartridge 10. The coil spring 36c is for biasing the arm 36b to press the roller 36a against the one side surface of the cartridge 10. The flag 36d is made to project from the arm 36b, and shifts in accordance with the swinging action of the arm 36b.

Furthermore, the photosensor 37 undergoes the light-interception by this flag 36d depending upon the movement of the flag 36d, and the aforesaid identifying section identifies the type of the cartridge 10 on the basis of the information about the light-interception from the photosensor 37.

In this embodiment, the accessor 7 has a diagnostic function to diagnose the dimensional accuracy of the accessor 7 by conducting the insertion and extraction of a diagnostic cartridge (not shown) into/from a diagnostic cell (not shown) placed at a given position within the library apparatus 1. The type identifying mechanism comprising the actuator 36, the photosensor 37 and the identifying section can identify, as one of a plurality of types of cartridges 10, a diagnostic cartridge on the basis of the irregularity of one side surface of the diagnostic cartridge (that is, the information about the light-interception from the photosensor 37).

Still further, in this embodiment, the operation of the accessor 7 is controlled so that the hand mechanism 7d regrips the cartridge 10 in a state where the cartridge 10 is introduced into the picker section 7g. At the cartridge 10 regripping operation by the hand mechanism 7d, the actuator 36 receives the biasing force of the coil spring 36c to press the other side surface of the cartridge 10 against the other guide member 35b, which finally serves as a positioning mechanism to always maintain the constant position of the other side surface of the cartridge 10 within the picker section 7g.

At this time, in the cartridge 10 regripping operation, for the purpose of preventing the cartridge 10 once released from the hand mechanism 7d from breaking out of the picker section 7g, the claw (locking member) 38 is placed on the guide member 35b side.

This claw 38 is disposed to protrude from the guide member 35b toward the cartridge side, and is swingable around a rotary shaft 38a and biased by an adequate force due to a spring 38b so that it is put out of the way by the cartridge 10 itself at the cartridge 10 inserting and extracting operations by the hand mechanism 7d while taking the locking condition with the cartridge 10 at the cartridge 10 regripping operation by the hand mechanism 7d.

In this embodiment, since the picker section 7g of the accessor 7 includes the type identifying mechanism, the actuator 36 acting as a positioning mechanism and the break-out (jump-out) preventing claw 38 as mentioned above, the following effects are attainable.

Various types of cartridges 10 are led into the picker section 7g while being guided by the pair of left- and right-hand guide members 35a, 35b. Further, the actuator 36 moves (taking the opening and closing actions) in accordance with the irregularity (external dimension) of one side surface of the cartridge 10 introduced into the picker section 7g. Further, utilizing the fact that the movement quantity of the actuator 36 varies depending upon the external dimension of the cartridge 10 (the type of the cartridge 10), the identification of the type of the cartridge 10 becomes possible.

More specifically, when the cartridge 10 is taken in the interior of the picker section 7g by the hand mechanism 7d, the roller 36a rotates to allow the movement of the cartridge 10 while coming into contact with one side surface of the cartridge 10 owing to the biasing force of the coil spring 36c, thus making the arm 36b swing around the rotary shaft 36e in accordance with the irregularity of the one side surface thereof. In synchronism with the swinging action of the arm 36b, the flag 36d moves, so that the photosensor 37 detects the movement quantity of this flag 36d as the light-interception information, with the identifying section (not shown) identifying the type of the cartridge 10 on the basis of the light-interception information from the photosensor 37.

In this way, the identification of the type of the cartridge 10 held in the picker section 7g is possible, and therefore, the processing (conveyance and insertion of cartridges to/into the storage rack or the deck 5a, and other operations) corresponding to the identification result is certainly feasible, and since a plurality of types of cartridges 10 can simultaneously be handed within one library apparatus 1, the certain conveyance of the plurality of types of cartridges 10 is possible, thus providing a more useful apparatus to the users and further meeting a variety of needs from the users.

Furthermore, the hand mechanism 7d regips the cartridge 10 in a state where the cartridge 10 is introduced into the picker section 7g, and at this time, the roller 36a coming into contact with one side surface of the cartridge 10 receives the biasing force of the coil spring 36c through the arm 36b to always press the other side surface of the cartridge 10 against the guide member 35b regardless of its type.

Whereupon, even in the case of treating various types of cartridges 10, in the picker section 7g, the cartridge 10 can always be reset to a given position (reference position) where the other side surface of the cartridge 10 is placed into contact with the guide member 35b. Accordingly, since it is possible to position the cartridge 10 (reset the cartridge 10 to the reference position) concurrently with identifying the type of the cartridge 10 within the accessor 7, the cartridge 10 can easily be inserted into the storage rack or the deck 5a in accordance with its type.

Furthermore, when the cartridge 10 is regripped by the hand mechanism 7d as mentioned above, in case that the cartridge 10 is shifted toward the exterior of the picker section 7g, the cartridge 10 is locked by the claw 38 to be prevented from falling out of the picker section 7g.

More specifically, since an appropriate biasing force due to the spring 38b works on the claw 38, at the insertion and extraction of the cartridge 10 by moving the hand mechanism 7d by the servo motor 31 and the timing belt 32 in the forward and backward directions, the claw 38 receives the drive force due to the servo motor 31 from the cartridge 10 to be put out of the way against the biasing force of the spring 38b, thus not limiting the insertion and extraction operations of the cartridge 10. The biasing force of the spring 38b, by contrast, inhibits the claw 38 from being put out of the way depending upon only the self-weight of the cartridge 10, and hence, the cartridge 10 is usually kept in the locked condition with the claw 38.

Thus, when positioning the cartridge 10 (resetting the cartridge 10 to the reference position) within the accessor 7, even if the hand mechanism 7d releases the cartridge 10, the break-out preventing claw 38 works to always maintain the state in which the cartridge 10 is surely held in the picker section 7g, and hence, the cartridge 10 is prevented from breaking out of the picker section 7g due to the vibrations and the abnormal actions of the accessor 7 itself, with the result that the library apparatus 1 is operable with a high reliability.

Still further, in this embodiment, the accessor 7 is capable of identifying not only the cartridge 10 accommodating a storage medium such as a magnetic tape but also a diagnostic cartridge, and in cases where the hand mechanism 7d grips the diagnostic cartridge, the corresponding operation becomes possible.

Whereupon, for diagnosing or checking whether or not the dimension of the accessor 7 itself is out of order, even using a special-purpose cartridge for diagnosis, it is possible to recognize that the cartridge used is for the purpose of the diagnosis, and therefore, the diagnosing operation for the accessor 7 itself is smoothly and surely feasible.

At the switching from the diagnosis to the normal operation, even if the hand mechanism 7d is in the state of gripping the diagnostic cartridge, because of the recognition thereof, it is possible to prevent the undesirable operation that the apparatus 1 gets into the normal action while the hand mechanism 7d grips the diagnostic cartridge.

[5] Description of Tilt Mechanism

In this embodiment, since the angles of insertion/discharge of the cartridge 10 are different from each other among units, it is necessary to change the cartridge inserting/extracting angle of the hand mechanism 7d.

As the cartridge insertion and extraction directions (angle) of the hand mechanism 7d in the embodiment, there are taken a horizontal direction (0°) and a direction looking downward by a given angle with respect to the horizontal direction. In the case of the deck 5a, in general the cartridge 10 is inserted and pulled out in/from the horizontal direction (0°). On the other hand, in the case of the storage rack or the like, the cartridge 10 is stored in a condition looking (inclined) downward (for example, by 12°) relative to the horizontal direction to prevent them from dropping from the cells of the storage rack due to the vibrations caused by earthquakes and others, and therefore, the insertion and extraction of the cartridge 10 is made at that angle.

For this reason, an assessor 7 according to this embodiment is, as shown in FIGS. 11 to 14, provided with a tilt mechanism 15 for adjusting the angle of the cartridge inserting/extracting directions with respect to a horizontal plane.

Figure 11A:
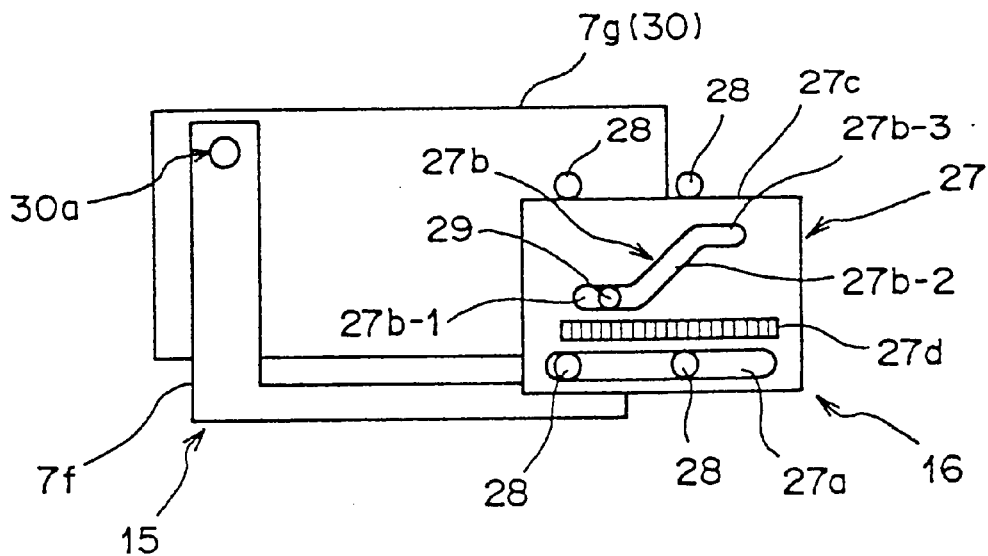
FIGS. 11A and 11B are side elevational views illustratively showing a tilt mechanism of the accessor in this embodiment, FIG. 11A illustrating a horizontally disposed condition of the picker section while FIG. 11B showing a tilt condition of the picker section.
Figure 11B:
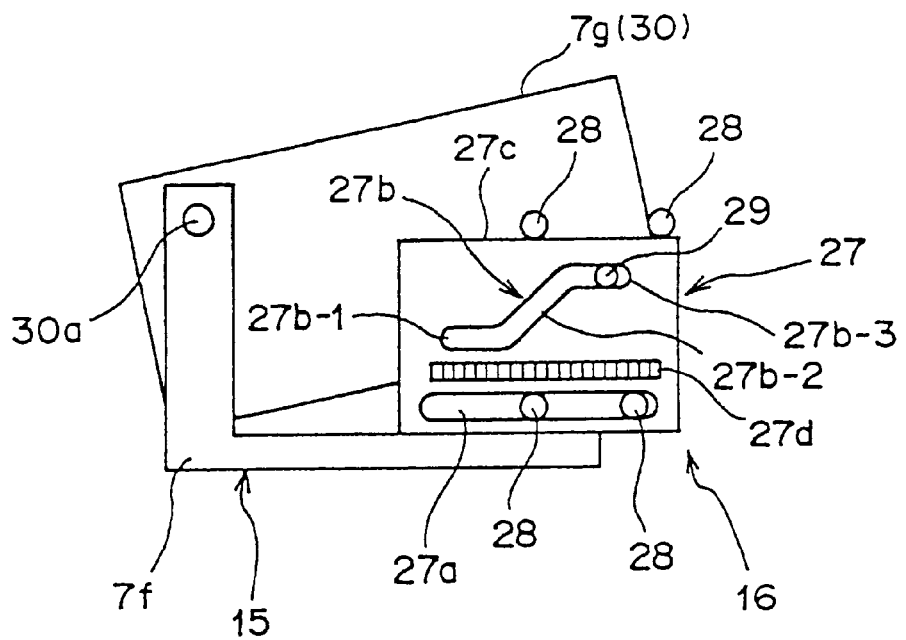
Figure 12:
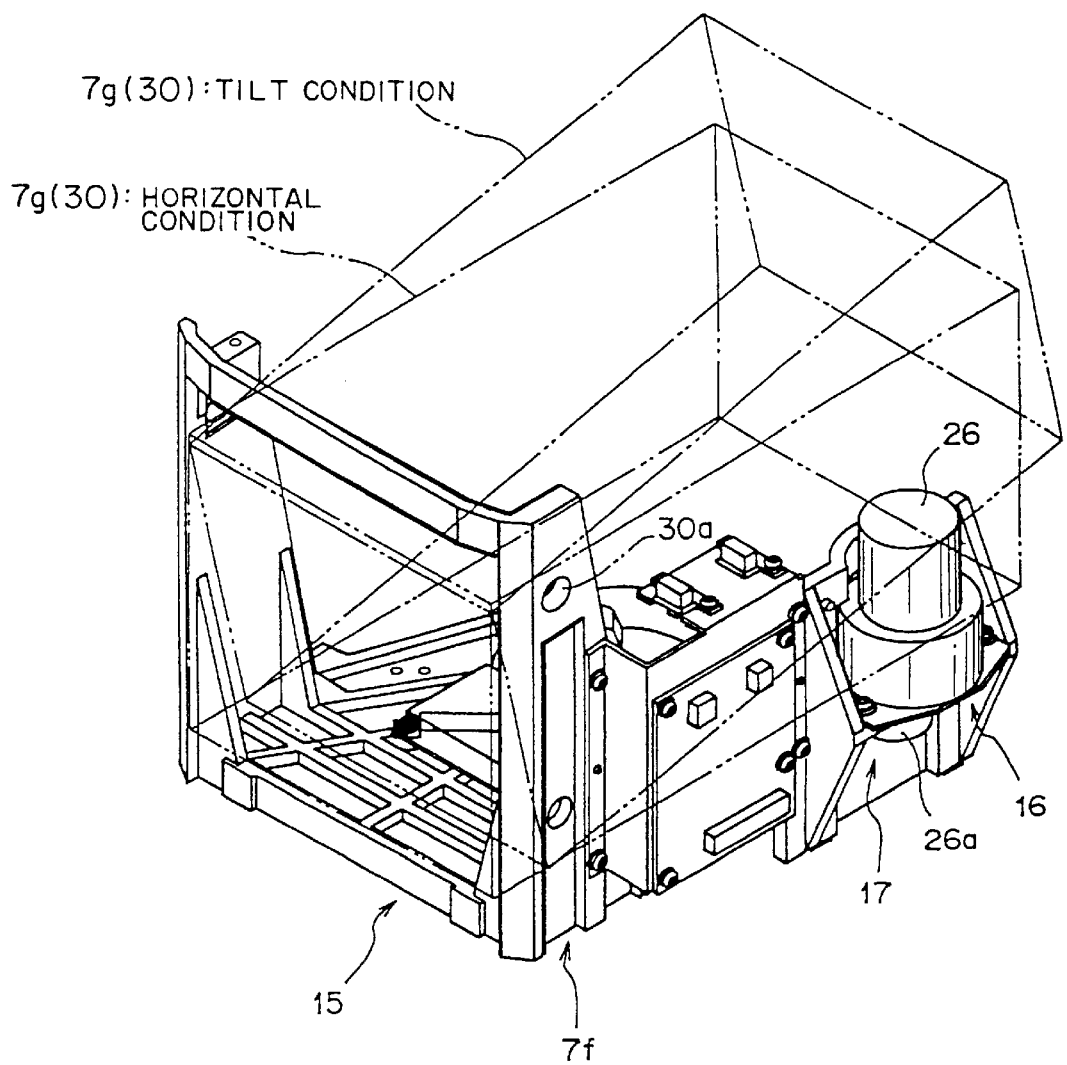
FIGS. 12 and 13 are perspective views showing a principal portion (tilt base) of the tilt mechanism of the accessor in this embodiment.
Figure 13:
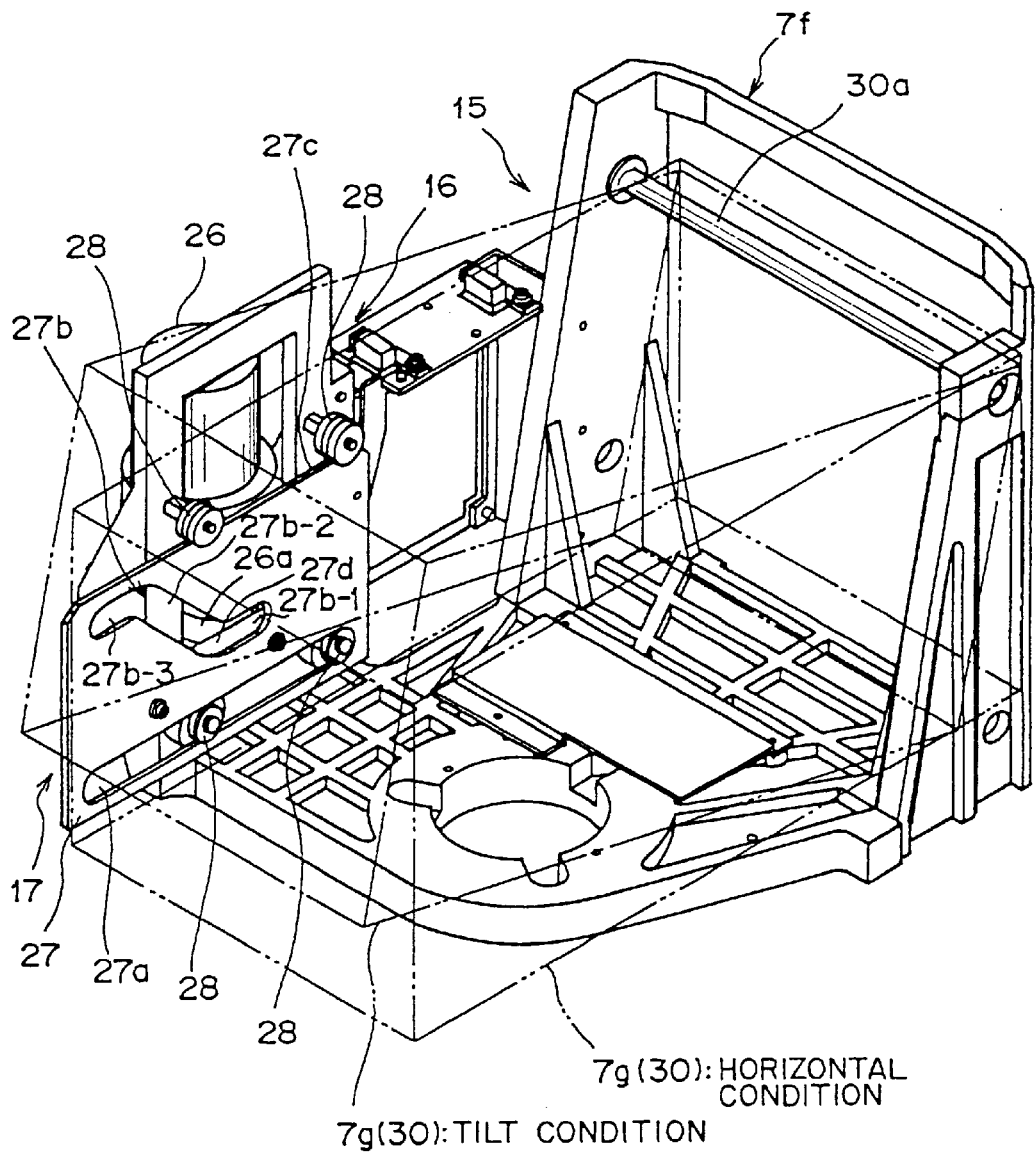
Figure 14:
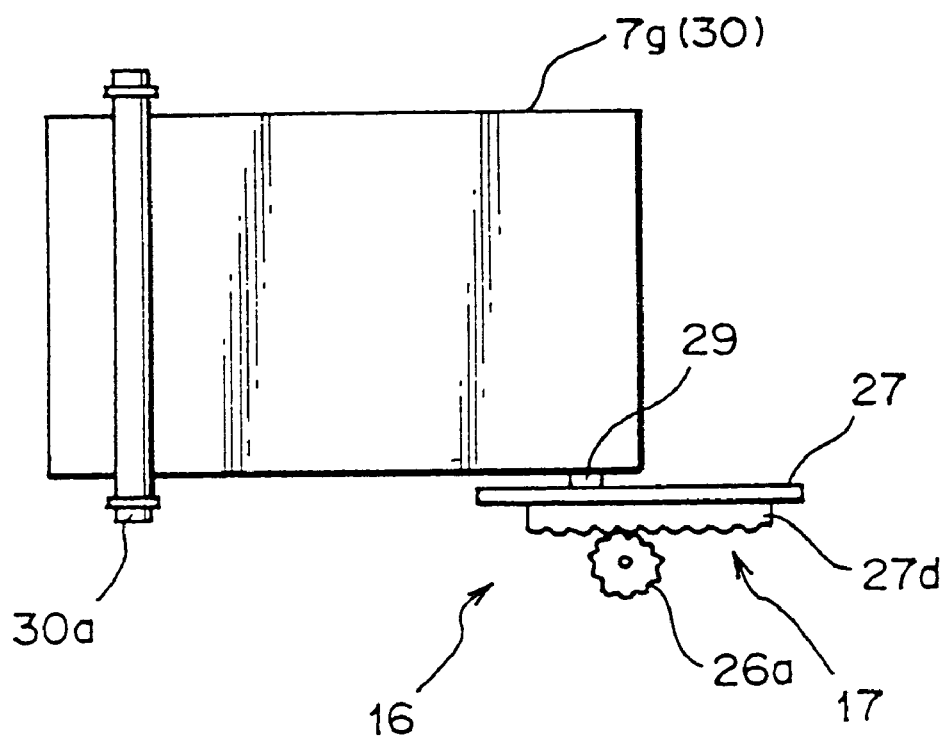
FIG. 14 is a plan view illustratively showing the tilt mechanism of the accessor in this embodiment.

FIGS. 11A and 11B are side elevational views illustratively showing the tilt mechanism 15 of the accessor 7 according to the first embodiment of this invention, and of these drawings, FIG. 11A shows a state where a picker section 7g is disposed in horizontal directions while FIG. 11B illustrates a case in which the picker section 7g is in a tilt condition (a condition looking downward by 12° from the horizontal direction). Further, FIGS. 12 to 14 also show the tilt mechanism 15 of the accessor 7 according to this embodiment, and in more detail, FIGS. 12 and 13 are perspective views showing a principal portion (tilt base 7f) of the tilt mechanism 15, and FIG. 14 is an illustrative plan view thereof. In these illustrations, the reference numerals being the same as those used in the above description depict the same or substantially same parts, and the detailed description thereof will be omitted for brevity.

As also shown in FIGS. 11A, 11B, 12 and 13, the picker section 7g (picker base 30) is fitted to a tilt base 7f to be swingable around a supporting shaft (rotary shaft) 30a, and is swingingly driven around the supporting shaft 30a through the use of a swinging drive mechanism 16 comprising a tilt motor 26, a plate cam 27 and a guide roller 28 placed on the side of a supporting base 7e and a cam follower 29 located on the picker section 7g side.

That is, the tilt mechanism 15 according to this embodiment is composed of the tilt base 7f and the swinging drive mechanism 16, and the picker section 7g is supported by the tilt base 7f to be swingable around the supporting shaft 30a placed at an upper portion of the picker section front surface side (the left side in FIGS. 11A, 11B and 14) facing the inserting and extracting place for the cartridge 10. Further, the swinging drive mechanism 16 is disposed on a lower side surface of the rear side (the right side in FIGS. 11A, 11B and 14) of the picker section 7g.

In addition, the swinging drive mechanism 16 is made up of a cam follower 29 protrusively fitted onto a rear side surface of the picker section 7g, a plate cam 27 located to be movable in the cartridge inserting/extracting direction with respect to the tilt base 7f for guiding the cam follower 29 in vertical directions in accordance with its forward and backward movements, and a drive mechanism 17 for moving the plate cam 27 in the cartridge inserting/extracting direction with respect to the tilt base 7f.

As shown in FIGS. 11A, 11B and 13, on the tilt base 7f side, two sets (pairs) of upper and lower rollers 28, 28 for supporting the plate cam 27 are pivotally fitted onto a rear side surface of the picker section 7g on the front and rear sides, respectively.

The plate cam 27 has an elongated guide hole 27a made to extend in the forward and backward directions, and this elongated guide hole 27a engages with the pair of lower guide rollers 28, 28 pivotally fitted onto the tilt base 7f side. In addition, the pair of upper guide rollers 28, 28 pivotally fitted onto the tilt base 7f side are brought into contact with a horizontal upper edge portion 27c of the plate cam 27 from the above. Whereupon, the plate cam 27 is attached to the tilt base 7f to be movable in the cartridge inserting/extracting direction (forward and backward directions) while being guided by the guide rollers 28.

Furthermore, as shown in FIGS. 11A, 11B, 13 and 14, a rack 27d is formed on the plate cam 27, and is engaged with a pinion 26a fitted over a drive shaft (not shown) of the tilt motor 26 as shown in FIGS. 13 and 14. In FIG. 14, the tilt motor 26 is omitted from the illustration.

Accordingly, when the pinion 26a is rotationally driven by the tilt motor 26, this rotational movement is converted into linear movements of the plate cam 27 through the rack 27d gearing with the pinion 26a, so that the plate cam 27 is driven to reciprocate in the cartridge inserting/extracting direction (in the forward/backward directions). That is, the tilt motor 26, the pinion 26a and the rack 27d organize the drive mechanism 17.

In addition, the plate cam 27 has an elongated swinging drive hole 27b to be made to engage with the cam follower 29. This elongated swinging drive hole 27b has two horizontal portions 27b-1, 27b-3 different in height from each other and an inclined portion 27b-2 making the connection between these horizontal portions 27b-1, 27b-3.

The front side horizontal portion 27b-1 is for maintaining the picker section 7g in the horizontal condition. As shown in FIG. 11A, in a state where the cam follower 29 is positioned at the horizontal portion 27b-1 of the elongated hole 27b, the picker section 7g is disposed horizontally, with the result that the cartridge inserting/extracting directions of the hand mechanism 7d is maintained to be the horizontal direction.

On the other hand, the rear side horizontal portion 27b-1 is formed at a position higher than the front side horizontal portion 27b-1, and is for maintaining the picker section 7g in the tilt condition in which the front surface of the picker section 7g is inclined by a given angle (for example, 12°) with respect to the horizontal direction. If the plate came 27 is shifted from the FIG. 11A state in the front direction (in the left-hand direction in FIG. 11A) so that the cam follower 29 moves from the horizontal portion 27b-1 through the inclined portion 27b-2 to the horizontal portion 27b-3 while being guided, as shown in FIG. 11B, the picker section 7g swings around the supporting shaft 30a to get into the tilt condition, with the result that the cartridge inserting/extracting direction of the hand mechanism 7d is taken to be the direction looking downward by a given angle (for example, 12°) with respect to the horizontal direction.

In the tilt mechanism 15 of the accessor 7 according to this embodiment thus constructed, the picker section 7g is swingingly driven around the supporting shaft 30a, placed on the picker section front surface side, through the swinging drive mechanism 16 disposed on the rear side of the picker section 7g, so that the cartridge inserting/extracting direction is adjustable with respect to a horizontal plane.

More specifically, since the supporting point (i.e., the position of the supporting shaft 30a) on the tilt action is located on the front side of the picker section 7g while the effort point (the driven position by the swinging drive mechanism 16, i.e., the position of the cam follower 29) is situated on the rear side of the picker section 7g, the distance $L_1$ from the supporting point (supporting shaft 30a) to the effort point (cam follower 29) can be set to be sufficiently longer than the distance $L_2$ from the supporting point to the tip position of the hand mechanism 7d (hand members 40a, 40b).

Accordingly, in the case of the tilt mechanism 15 according to this embodiment, $L_2/L_1$ can be set to below 1, and the dimensional error dy at the effort point (cam follower 29) can be prevented from being enlarged and amplified at the tip position of the hand mechanism 7d.

As described above, in the case of the tilt mechanism 15 according to the this embodiment, with only the change of the positional relationship between the supporting point and the effort point on the tilt action, it is possible to sharply improve the accuracy of the cartridge inserting/extracting direction of the hand mechanism 7d, and further to ensure the positional accuracy of the tip portion of the hand mechanism 7d which is sufficient for the direct insertion and extraction of the cartridge 10 into/from the deck 5a. Thus, without installing the cartridge giving and receiving mechanism at every deck 5a, the direct insertion and extraction of the cartridge 10 into/from each of the decks 5a through the hand mechanism 7d becomes possible, which contributes to the size reduction and lower manufacturing cost of the library apparatus 1.

[6] Description of Hand Mechanism

A description will be made hereinbelow of the detailed arrangement of the hand mechanism 7d including a structure constituting a feature of this invention.

Figure 15:
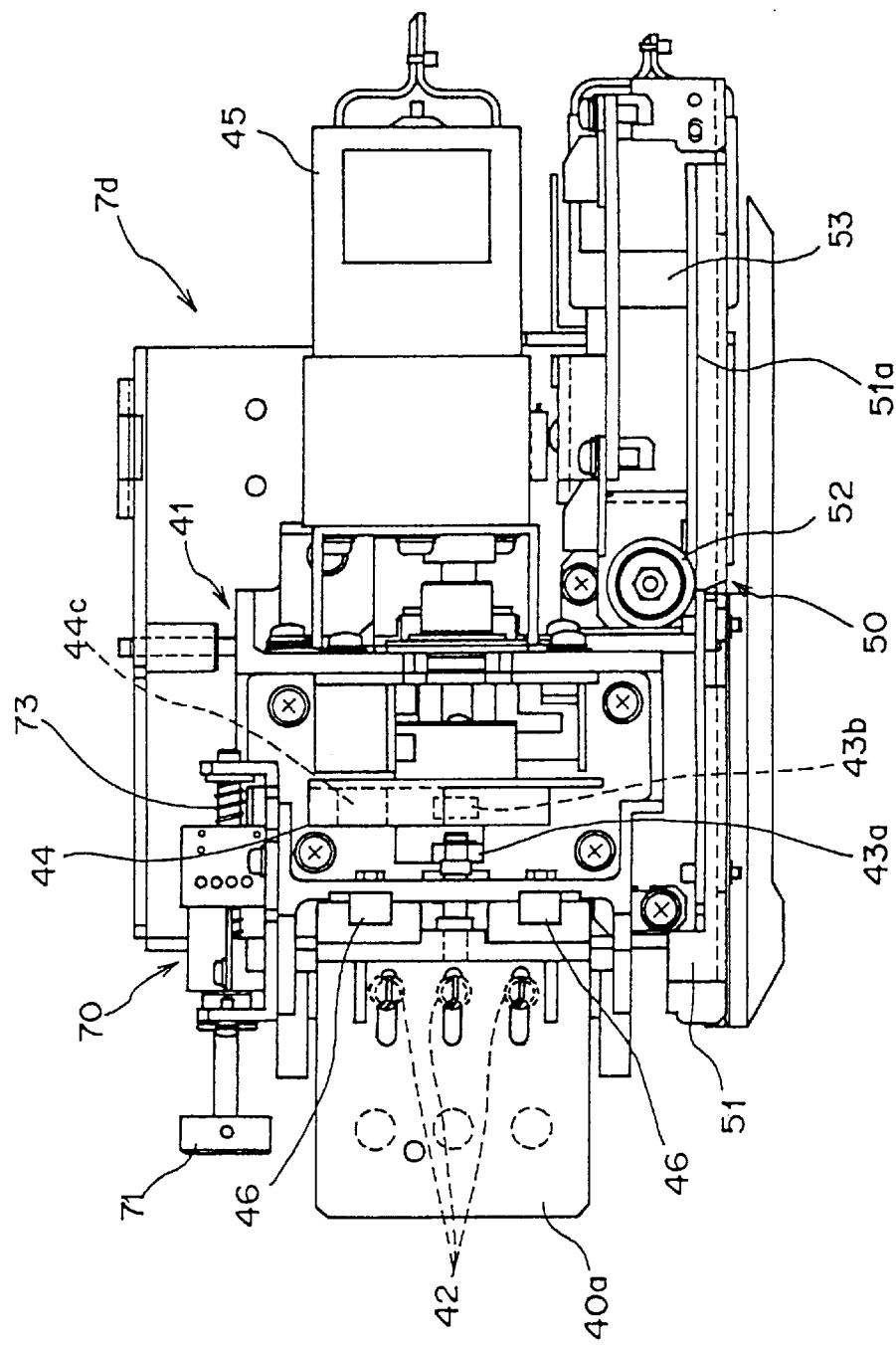
FIGS. 15 and 16 are respectively a plan view and a side elevational view showing the hand mechanism of the accessor according to this embodiment.
Figure 16:
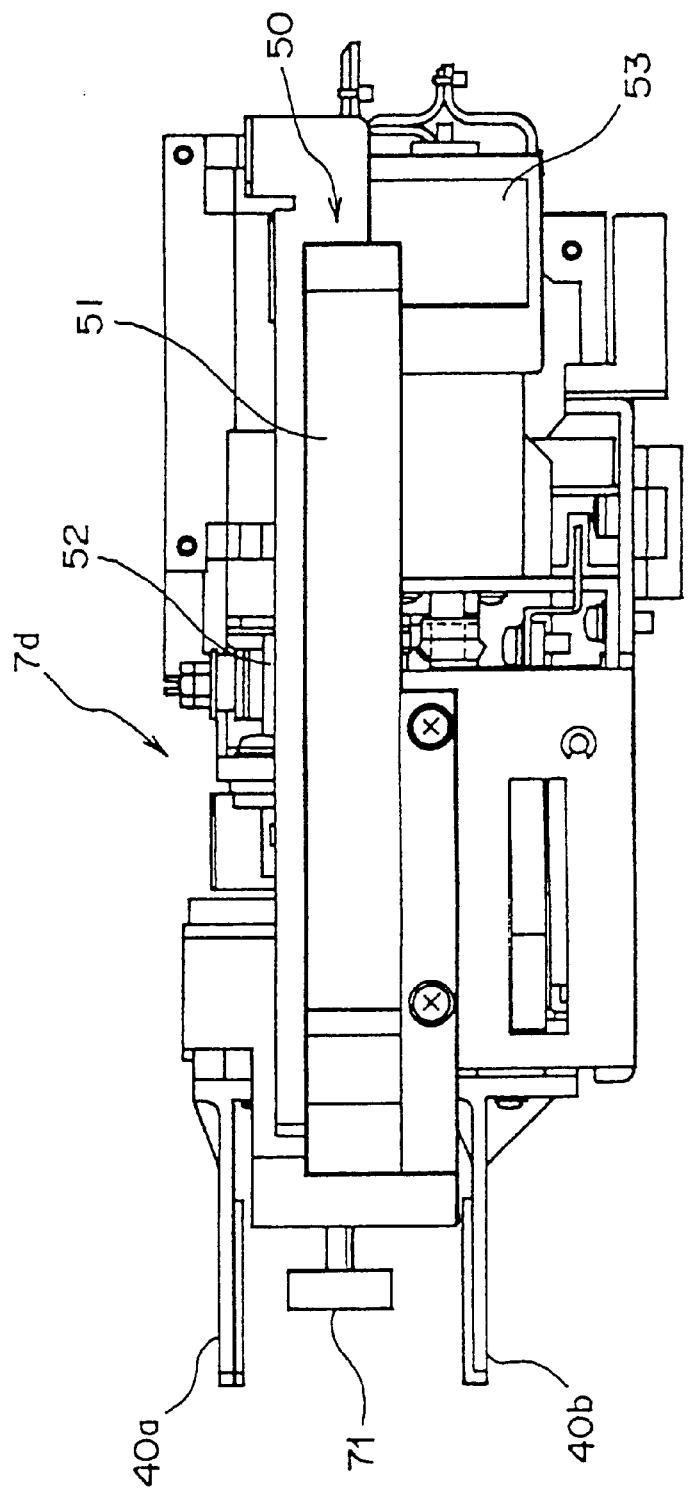
Figure 17:
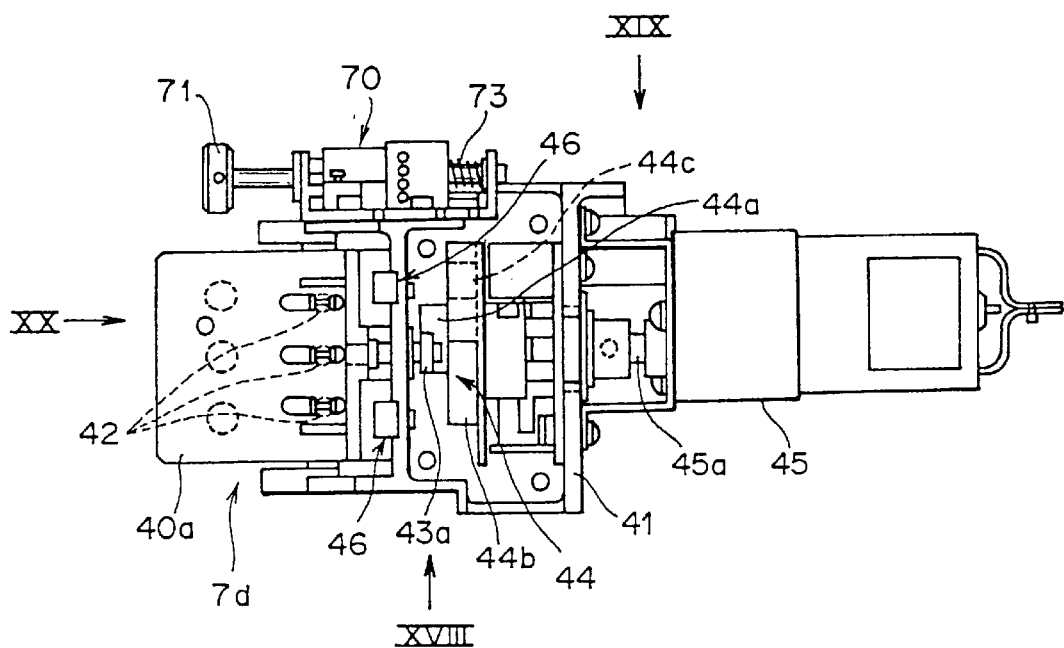
FIG. 17 is a plan view showing a principal portion of the hand mechanism of the accessor in this embodiment.
Figure 18:
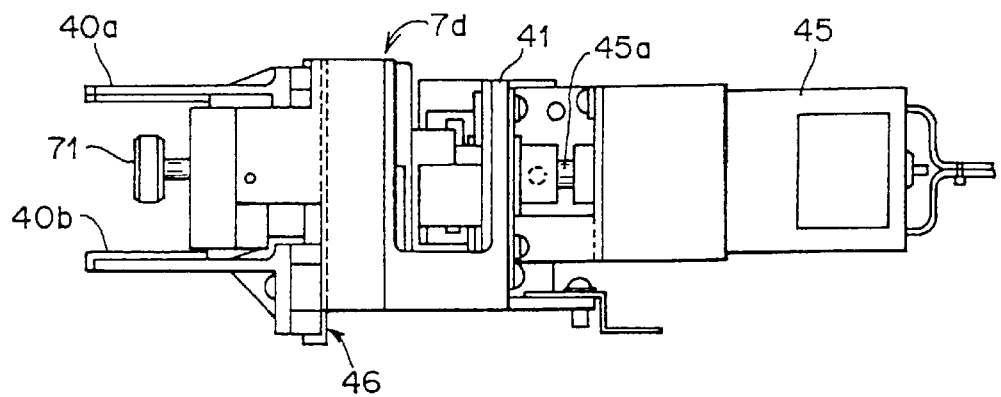
FIGS. 18, 19 and 20 are illustrations of portions indicated by arrows XVIII, XIX and XX in FIG. 17.
Figure 19:
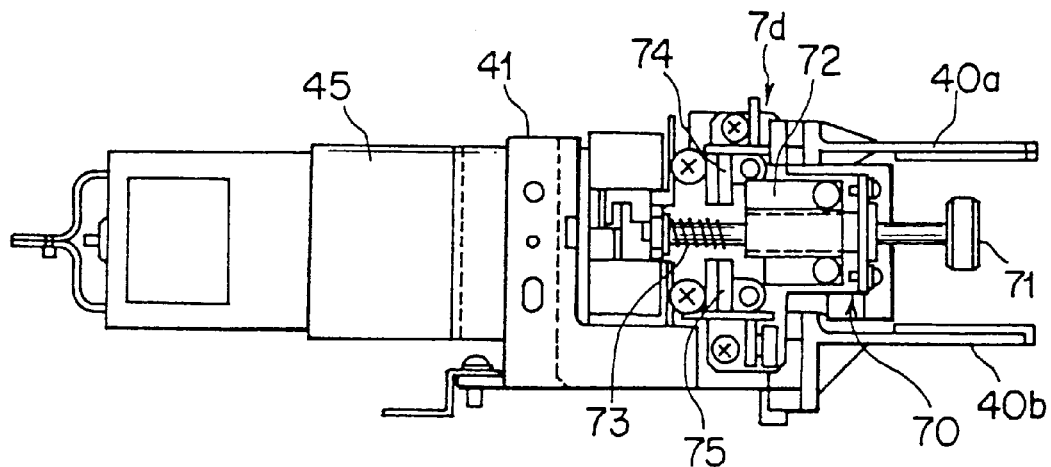
Figure 20:
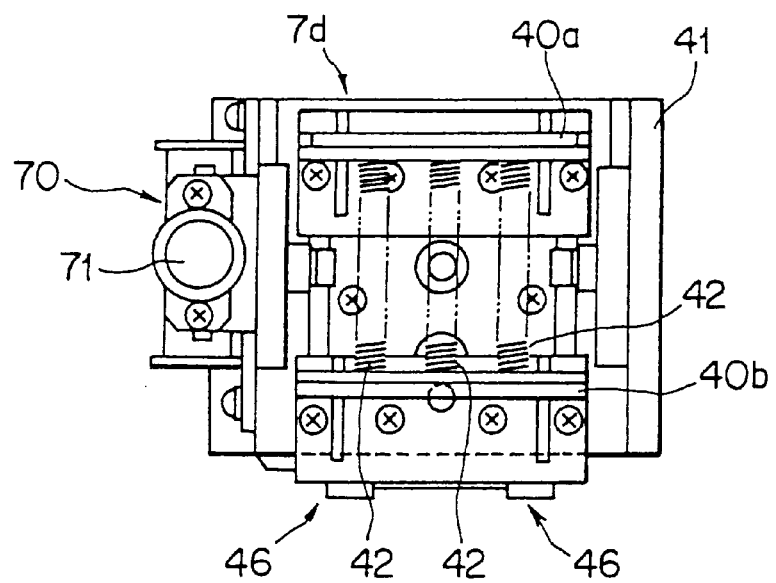

FIGS. 15 and 16 are respectively plan and side elevational views showing the hand mechanism 7d of the accessor 7 in this embodiment. Further, FIGS. 17 to 20 are illustrations of a principal portion of the hand mechanism 7d of the accessor 7 according to this embodiment. Of these drawings, FIG. 17 is a plan view thereof, FIG. 18 is an illustration of a portion indicated by an arrow XVIII in FIG. 17, FIG. 19 is an illustration of a portion shown by an arrow XIX in FIG. 17, and FIG. 20 is an illustration of a portion shown by an arrow XX in FIG. 17.

As shown in FIGS. 15 to 20, this hand mechanism 7d is, as mentioned before, provided with the pair of upper and lower hand members 40a, 40b, the hand base 41, the spring 42, the pair of upper and lower cam followers 43a, 43b, the cam 44, the hand opening and closing drive motor 45, the pair of linear ways 46, the mounter mechanism 50, the CIP/CSP unit 70, and others. In these illustrations, the reference numerals being the same as those taken in the above description denote the same or substantially same parts.

The pair of upper and lower hand members 40a, 40b come into contact with the cartridge 10 from the above and below to grip the cartridge 10, and are fitted onto the hand base 41 to be allowed to slide vertically through the pair of left- and right-hand leaner ways (direct-acting bearings, LM guide) 46, 46. Interposed between the hand members 40a, 40b are three springs (biasing mechanism) 42 which biases the hand members 40a, 40b in the closing directions of gripping the cartridge 10.

Figure 1A:
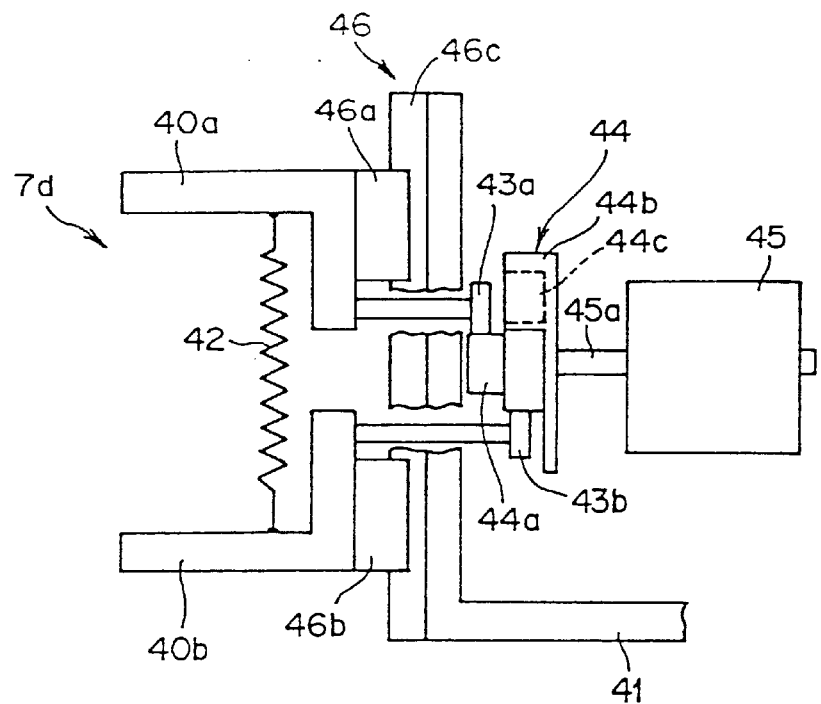
FIGS. 1A and 1B are a partially broken side elevational view and a perspective view illustratively showing a principal portion of a hand mechanism of a cartridge transferring robot (accessor) for a library apparatus according to an embodiment of the present invention.
Figure 1B:
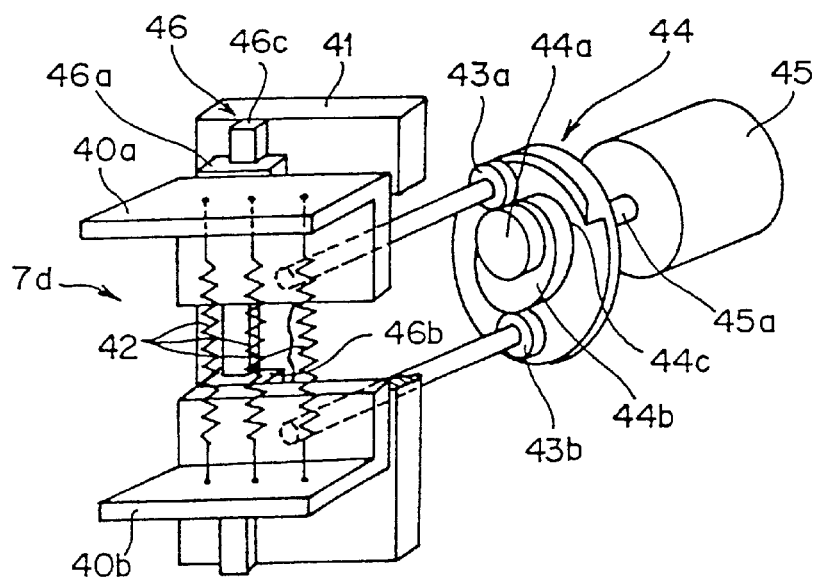

Incidentally, as shown in FIGS. 1A and 1B, each of the linear ways 46 is made up of one guide rail 46c attached to the hand base 41 side and two blocks (bearings) 46a, 46b which slide while being guided vertically along the guide rail 46c, and the hand members 40a, 40b are fitted to the blocks 46a, 46b, respectively. However, in FIGS. 1A and 1B, only one linear way 46 is shown. It is also appropriate that only one linear way 46 is provided as shown in FIGS. 1A and 1B.

[6-1] Description of Opening and Closing Mechanism for Hand Members

Secondly, referring to FIGS. 1 and 21 to 34, a description will be taken hereinbelow of an opening and closing mechanism for the hand members 40a, 40b in the hand mechanism 7d according to this embodiment.

FIGS. 1A and 1B are respectively partially broken side elevational and perspective views illustratively showing a principal portion of the hand mechanism 7d of the accessor 7 according to this embodiment. As shown in FIGS. 1A and 1B, cam followers 43a, 43b are attached to the hand members 40a, 40b, respectively. A disc-like double-lift cam 44 is placed between the pair of upper and lower cam followers 43a, 43b.

This disc-like double-lift cam 44 is for the purpose of adjusting the separation between the cam followers 43a, 43b to cause the hand members 40a, 40b to be driven to take opening and closing actions against the biasing forces of the springs 42. The disc-like double-lift cam 44 is composed of a first disc-like cam 44a made to come into contact with an circumferential surface of the upper cam follower 43a and a second disc-like cam 44b made to come into contact with a circumferential surface of the lower cam follower 43b. The second cam 44b has a lock groove 44c as will be described herein later.

Furthermore, the disc-like double-lift cam 44 is connected to a rotational drive shaft 45a of the hand opening and closing drive motor (drive mechanism) 45 and is made to be rotationally driven by the hand opening and closing drive motor 45.

Figure 21:
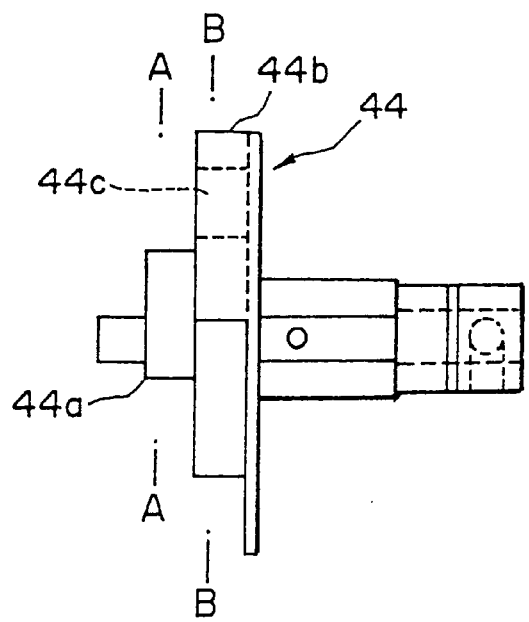
FIGS. 21 and 22 are respectively a side elevational view and a front elevational view showing a cam of the hand mechanism in this embodiment.
Figure 22:
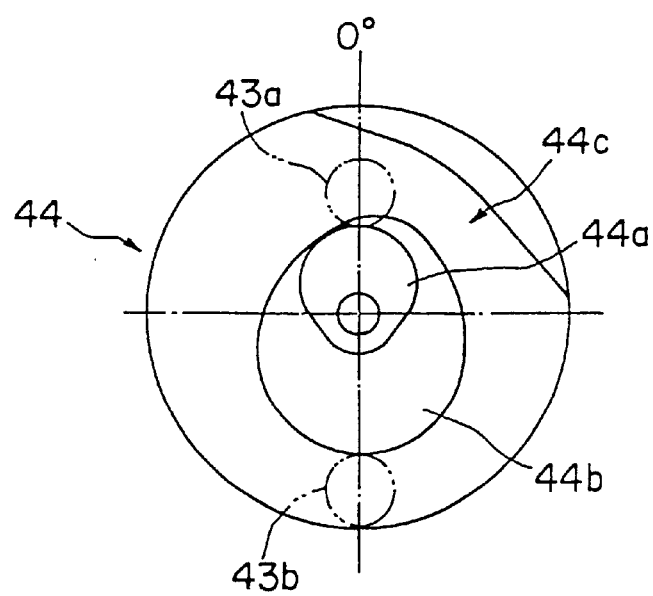
Figure 23A:
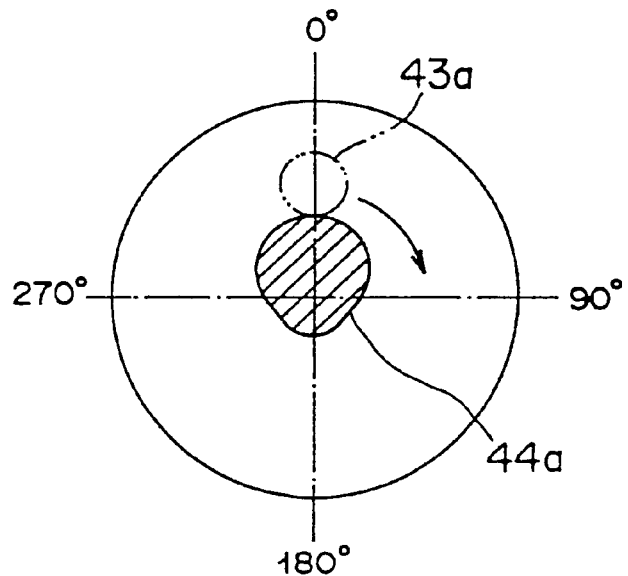
FIGS. 23A and 23B are respectively a cross-sectional view taken along a line A—A in FIG. 21 and a cross-sectional view taken along a line B—B in FIG. 21.
Figure 23B:
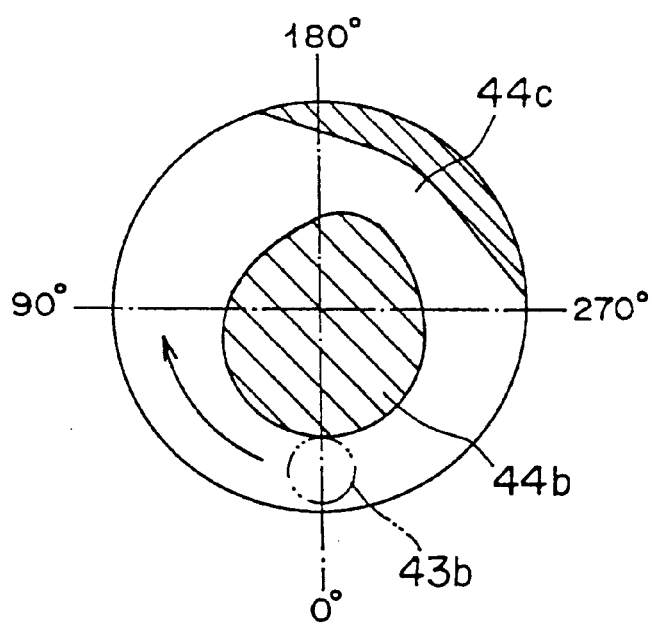
Figure 24:
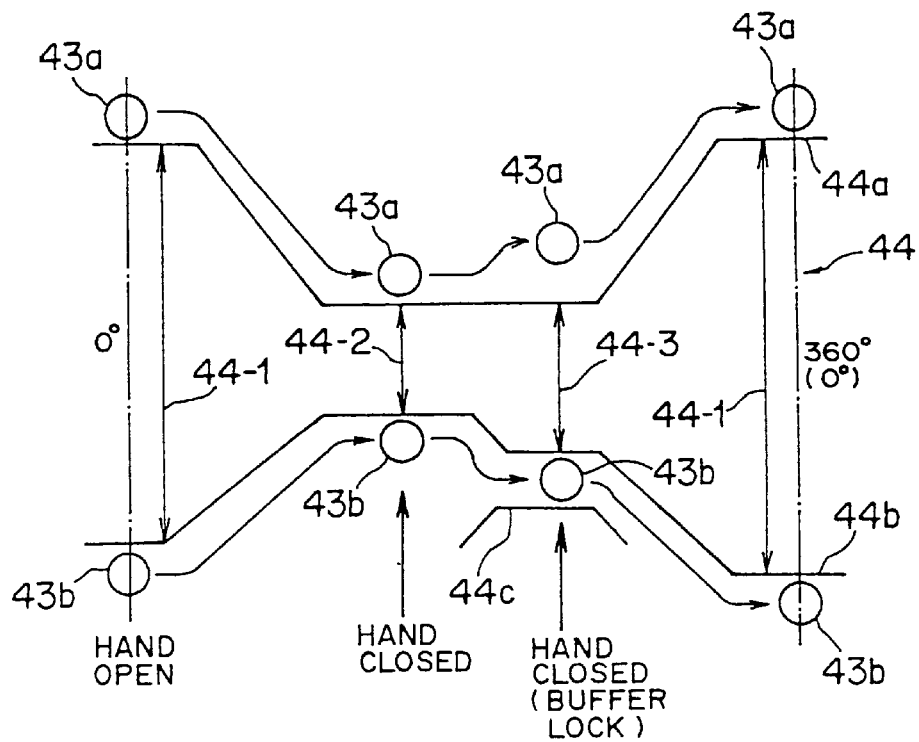
FIG. 24 is an illustration of a cam curve of the cam of the hand mechanism in this embodiment.

Referring to FIGS. 21 to 24, a description will be made hereinbelow of concrete configuration and function of the disc-like double-lift cam 44. FIGS. 21 and 22 are respectively a side elevational view and a front elevational view showing the cam 44, FIGS. 23A and 23B are a cross-sectional view taken along a line A—A in FIG. 21 and a cross-sectional view taken along a line B—B in FIG. 21, respectively, and FIG. 24 is an illustration of a cam curve of the cam 44.

In this embodiment, as shown in FIGS. 21, 22, 23A and 23B, the disc-like first cam 44a made to come into contact with the circumferential surface of the upper cam follower 43a is connected to the second disc-like cam 44b made to come into contact with the circumferential surface of the lower cam follower 43b. In addition, a portion (a lock portion 44-3 which will be described herein later) of the circumference or periphery of the second cam 44b has a lock groove 44c formed to engage with the lower cam follower 43b. FIG. 23A shows the cross-sectional configuration of the first cam 44a while FIG. 23B illustrates the cross-sectional configurations of the second cam 44b and the lock groove 44c.

Furthermore, as shown in FIG. 24, the first cam 44a, the second cam 44b and the lock groove 44c of the cam 44 produce a hand opening section 44-1, a cartridge gripping section 44-2 with a buffer function and a lock section 44-3.

When the hand opening section 44-1 comes to between the cam followers 43a, 43b, the separation between the cam followers 43a, 43b is adjusted so that the hand members 40a, 40b assume an open condition against the biasing forces of the springs 42.

Figure 25:
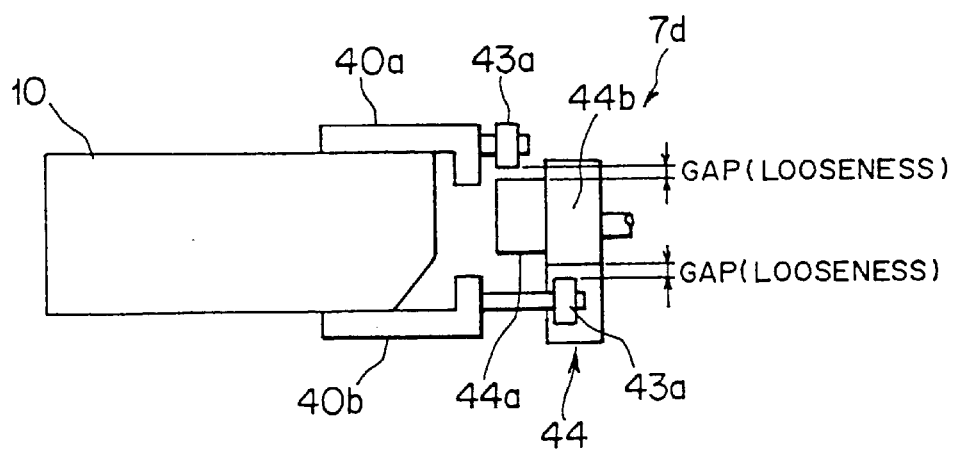
FIG. 25 is a side elevational view of a principal portion, illustratively showing a cartridge gripping state in a buffer lock-off condition in this embodiment.

When the cartridge gripping section 44-2 with the buffer function comes to between the cam followers 43a, 43b, as shown in FIG. 25, a gap (looseness) appears between the cam 44 (the first cam 44a, the second cam 44b) and each of the cam followers 43a, 43b. In this state, the hand members 40a, 40b get into the closed condition owing to the biasing forces of the springs 42 to grip the cartridge 10. The aforesaid gap (looseness) provides a buffer function as will be described herein later.

Figure 26:
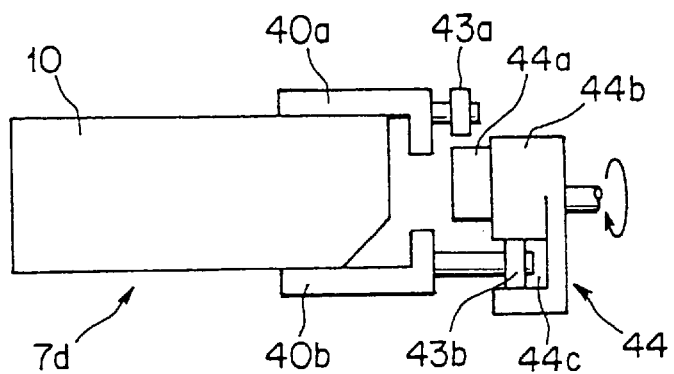
FIG. 26 is a side elevational view of a principal portion, illustratively showing a cartridge gripping state in a buffer lock-on condition in this embodiment.

The lock section 44-3 corresponds to the aforesaid formed lock groove 44c, and if this lock section 44-3 is located between the cam followers 43a, 43b, as shown in FIG. 26, the lower cam follower 43b is fitted in the lock groove 44c, the aforesaid gap (looseness) disappears, so that the hand members 40a, 40b are fixed to the hand base 41 in a state of gripping the cartridge 10.

FIG. 25 is a side elevational view of a principal portion, illustratively showing a cartridge gripping state under the buffer lock-off condition (looseness-present condition), while FIG. 26 is a side elevational view of a principal portion, illustratively showing a cartridge gripping state under the buffer lock-on condition (looseness-absent condition).

The hand opening and closing drive motor 45 is made to reversibly drive the cam so that one of the hand opening section 44-1, the cartridge gripping section 44-2 with the buffer function and the lock section 44-3 is set between the cam followers 43a, 43b.

In this case, whether to forwardly drive the motor 45 or reversely drive it depends upon whether or not to define the aforesaid gap in a state where the cartridge 10 is held between the hand members 40a, 40b (buffer lock off/on).

For instance, in the case of switching between the hand open condition and the hand closed condition with the buffer function (with gap/looseness), the cam 44 is driven forwardly/reversely between the section 44-1 [0° (360°)] and the section 44-2.

Furthermore, when conducting the switching between the hand open condition and the hand closed condition with no buffer function (with no gap/looseness), the cam 44 is driven forwardly/reversely between the section 44-1 [360° (0°)] and the section 44-3.

Still further, when performing the switching (switching between the presence and absence of the buffer function) between the hand closed condition with the buffer function (with gap/looseness) and the hand closed condition with no buffer function (with no gap/looseness), the cam 44 is driven forwardly/reversely between the section 44-2 and the section 44-3.

Moreover, a description will be made hereinbelow of an operation of the opening and closing mechanism for the hand members 40a, 40b in this embodiment.

In case where the hand opening section 44-1 of the cam 44 is set between the cam followers 43a, 43b by the drive of the motor 45, the separation between the cam followers 43a, 43b is enlarged through the cam 44 so that the hand members 40a, 40b get into the open condition. In gripping the cartridge 10 by the hand mechanism 7d, after the cartridge 10 is put between the hand members 40a, 40b being in the open condition, the cartridge gripping position 44-2 of the cam 44 is placed between the cam followers 43a, 43b by the drive of the motor 45, so that the hand members 40a, 40b receive the biasing forces of the springs 42 to come into contact with the cartridge 10 from the above and below, thereby gripping the cartridge 10.

At this time, as shown in FIG. 25, since the gaps take place between the first and second cams 44a, 44b and the cam followers 43*a*, 43*b*, the hand members 40*a*, 40*b* are movable up and down by quantities corresponding to the gaps (looseness) in a state of gripping the cartridge 10, that is, the gaps function as a buffer.

Accordingly, even though positional slippage slightly occurs between the cartridge insertion opening of the deck 5*a* and the cartridge 10 gripped by the hand mechanism 7*d*, that positional slippage is absorbable through the vertical movements corresponding to the aforesaid gaps (looseness), so that the cartridge 10 can certainly be inserted into the deck 5*a* using the gaps as a buffer.

Furthermore, when the motor 45 is driven to cause the lock section 44-3 of the cam 44 to come to between the cam followers 43*a*, 43*b*, as shown in FIG. 26, the lower cam follower 43*b* is engaged with the lock groove 44*c* of the second cam 44*b* so that the hand members 40*a*, 40*b* are fixed to the hand base 41 in a state of gripping the cartridge 10.

For instance, when disconnecting the lock member locking the cartridge 10 in the storage rack from the cartridge 10 in pulling out the cartridge 10 from the storage rack, there is a need for the cartridge 10 to be slightly lifted up in a state of being gripped by the hand members 40*a*, 40*b*. In such a case, in this embodiment, as shown in FIG. 26, the buffer lock-on condition is taken so that the hand members 40*a*, 40*b* are fixed to the hand base 41 in a state of gripping the cartridge 10, with the result that the vertical movements of the hand members 40*a*, 40*b* due to the looseness is suppressible, thus allowing the certain lifting-up of the cartridge 10.

In the hand mechanism 7*d* (accessor 7) of this embodiment equipped with the foregoing opening and closing mechanism, that opening and closing mechanism for the hand members 40*a*, 40*b* can be constructed to be extremely simplified and compact, which realizes the size and cost reduction of the library apparatus 1 shown in FIG. 2.

Still further, when the buffer function given cartridge gripping section 44-2 of the cam 44 is disposed between the cam followers 43*a*, 43*b*, even if there is a slight positional slippage between the cartridge insertion opening of the deck 5*a* and the cartridge 10 gripped by the hand mechanism 7*d*, that positional slippage is absorbable by the vertical movements thereof corresponding to the gaps between the first and second cams 44*a*, 44*b* and the cam followers 43*a*, 43*b*.

That is, in this embodiment, making the most of the looseness as a buffer, the hand members 40*a*, 40*b* can freely follow the other party (the cartridge insertion opening of the deck 5*a*) by the quantity corresponding to the looseness, which ensures the certain insertion of the cartridge 10 into the deck 5*a*, thereby eliminating the need for installing a cartridge delivering and receiving mechanism at every deck 5*a* to contribute the size and cost reduction of the library apparatus In addition, referring now to FIGS. 27 to 34, a description will be taken hereinbelow of various examples of modifications of the opening and closing mechanism for the hand members 40*a*, 40*b* of the hand mechanism 7*d* in this embodiment.

(6-1-1) Description of First Cam Modification

Figure 27:
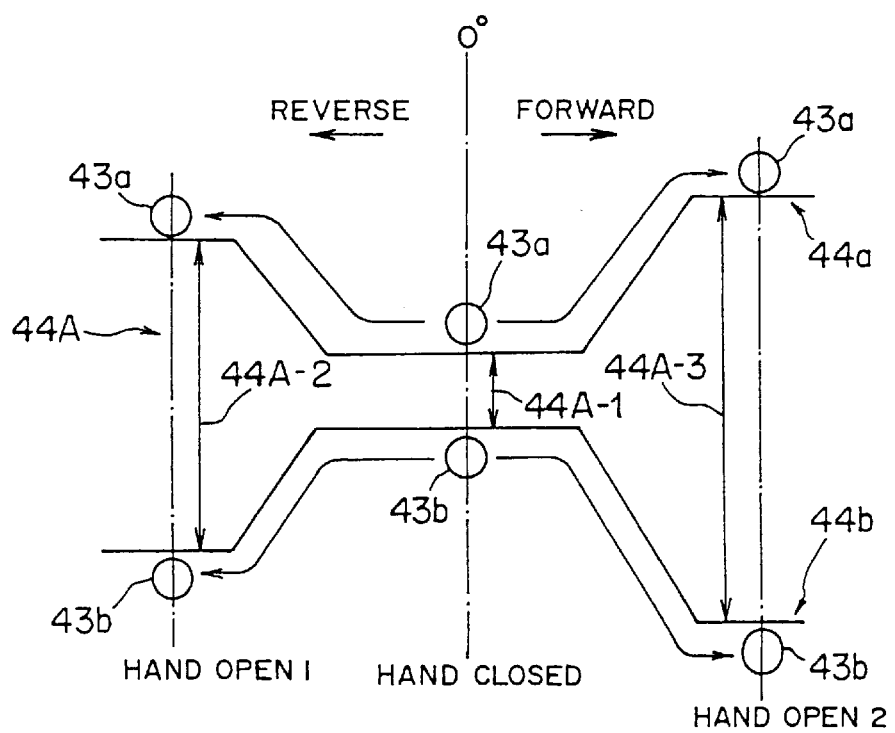
FIG. 27 is an illustration of a cam curve of a first modification of the cam of the hand mechanism in this embodiment.

FIG. 27 is an illustration of an cam curve of a cam of the hand mechanism 7*d* according to a first modification of this embodiment. As shown in FIG. 27, in the first modification, a cam 44A is constructed as a disc-like double-lift cam as well as the first-mentioned cam 44. In the cam 44A, as shown in FIG. 27, a first cam 44*a* coming into contact with the circumferential surface of the upper cam follower 43*a* and a second cam 44*b* coming into contact with the circumferential surface of the lower cam follower 43*b* produce one cartridge gripping section 44A-1 and two hand opening sections 44A-2, 44A-3.

If the cartridge gripping section 44A-1 is located between the cam followers 43*a*, 43*b*, each of the cam followers 43*a*, 43*b* gets into a substantially contacting condition (condition not defining a gap) with the cam 44A (first and second cams 44*a*, 44*b*), so that the hand members 40*a*, 40*b* take the closed condition due to the biasing forces of the springs 42 to grip the cartridge 10.

On the other hand, when one of the two hand opening sections 44A-2, 44A-3 is placed between the cam followers 43*a*, 43*b*, the separation between the cam followers 43*a*, 43*b* is adjusted so that the hand members 40*a*, 40*b* take the open conditions with different separations against the biasing forces of the spring 42. In this case, the hand opening section 44A-3 is formed to produce a larger separation between the hand members 40*a*, 40*b* than produced by the hand opening section 44A-2.

Furthermore, the hand opening and closing drive motor 45 is made to forwardly/reversely drive the cam 44A to cause one of the cartridge gripping section 44A-1 and the hand opening sections 44A-2, 44A-3 to be put between the cam followers 43*a*, 43*b*.

The aforesaid cam 44A is employed when different types of media (cartridges 10) with different thickness exist by mixture within the library apparatus 1, and taking the position (0°) of the cartridge gripping section 44A-1 as a reference position, the cam 44A is forwardly/reversely driven from the reference position in accordance with the thickness of the cartridge 10 to place one of the hand opening sections 44A-2, 44A-3 in between the cam followers 43*a*, 43*b*.

The forward side hand opening section 44A-3 is taken in the case that the cartridge 10 to be gripped has a large thickness, and in a manner that the cam 44A is alternately driven between the cartridge gripping section 44A-1 and the hand opening section 44A-3, the hand members 40*a*, 40*b* take the opening and closing actions.

On the contrary, the reverse side hand opening section 44A-2 is available in the case that the cartridge 10 to be gripped has a small thickness, particularly, is used when there is a limitation that difficulty is encountered to enlarge the open width (separation) between the hand members 40*a*, 40*b* up to the open width resulting from the hand opening section 44A-3. In a similar way, the hand members 40*a*, 40*b* are driven to take the opening and closing actions in a manner that the cam 44A is alternately driven between the cartridge gripping section 44A-1 and the hand opening section 44A-2.

In the hand mechanism 7*d* employing the cam 44A thus constructed, the separation between the hand members 40*a*, 40*b* is changeable in accordance with the thickness of the cartridge 10 and the limitation in the open width between the hand members 40*a*, 40*b*, and therefore, various types of cartridges with different thickness can be situated between the hand members 40*a*, 40*b* to surely catch them therebetween.

Accordingly, in cooperation with the foregoing type identifying mechanism of the picker section 7*g* in this embodiment, a library apparatus 1 in which a plurality of types of cartridges exist by mixture is realizable.

In the cam 44A shown in FIG. 27, it is also appropriate that the cartridge gripping section with the buffer or the lock section mentioned above with reference to FIG. 24 is formed in place of the cartridge gripping section 44A-1, or that three or more hand opening sections are made thereon. In addition, if the cam 44A is made so that the separation between the cam followers 43a, 43b is adjustable in the stepless condition, only in a manner that an appropriate portion of the cam 44A is put between the cam followers 43a, 43b by the drive of the motor 45, the separation between the hand members 40a, 40b is adjustable to assume an arbitrary open width.

(6-1-2) Description of Second Cam Modification

Figure 28:
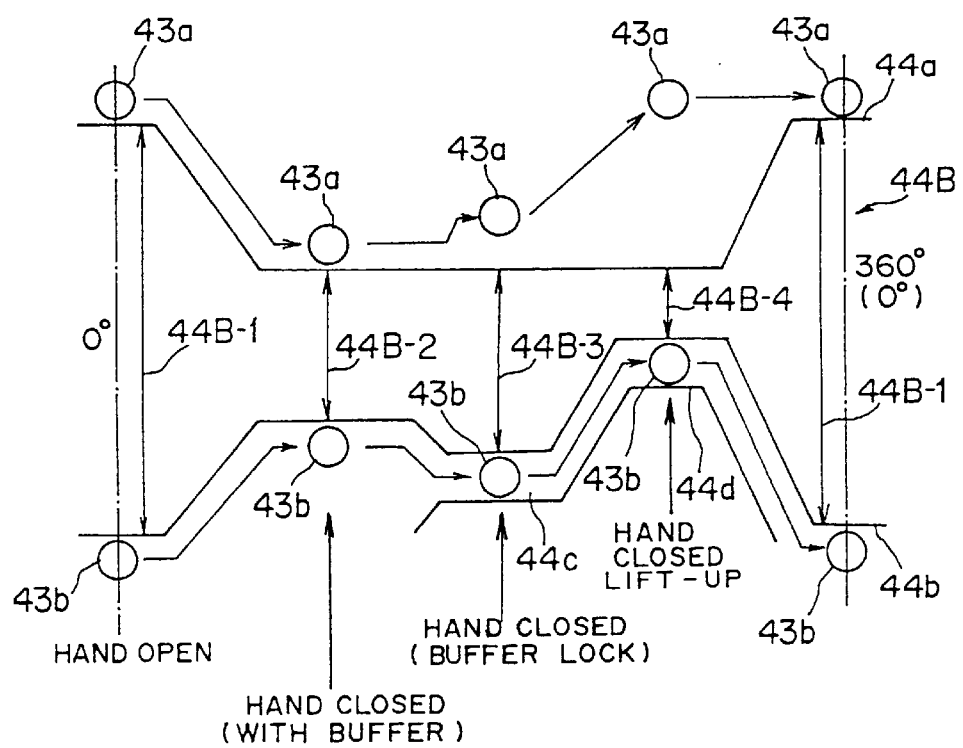
FIG. 28 is an illustration of a cam curve of a second modification of the cam of the hand mechanism in this embodiment.

FIG. 28 is an illustration of a cam curve of a cam of the hand mechanism 7d according to a second modification of this embodiment. As shown in FIG. 28, a cam 44B being the second modification is also constructed as being a disc-like double-lift cam approximately similar to the aforesaid cam 44.

In the case of this cam 44B being the second modification, as shown in FIG. 28, in addition to a first cam 44a, a second cam 44b and a lock groove 44c similar to those of the aforesaid cam 44, a lift-up groove 44d, which will be mentioned herein later, define a hand opening section 44B-1, a cartridge gripping section 44B-2 with a buffer function, a lock section 44B-3 and a lift-up section 44B-4.

The hand opening section 44B-1, the cartridge gripping section 44B-2 with the buffer function and the lock section 44B-3 are the same as the hand opening section 44-1, the cartridge gripping section 44-2 with the buffer function and the lock section 44-3 described above with reference to FIG. 24, respectively, and therefore, the description thereof will be omitted for brevity.

The lift-up section 44B-4 of the cam 44B according to the second modification is, as shown in FIG. 28, a portion in which a lift-up groove 44d is made to communicate with the lock groove 44c, and when this lift-up section 44B-4 is located between the cam followers 43a, 43b, the lower cam follower 43b is fitted in the lift-up groove 44d, so that the aforesaid gap (looseness) disappears and the hand members 40a, 40b are forced to be raised and fixed with respect to the hand base 41 in a state of gripping the cartridge 10.

Moreover, the hand opening and closing drive motor 45 is made to forwardly/reversely operate the cam 44B to place one of the sections 44B-1 to 44B-4 in between the cam followers 43a, 43b.

The hand mechanism 7d using the cam 44B thus constructed can offer the same effects as those of the hand mechanism 7d including the aforesaid cam 44, and in case where there is a need to slightly lift up the cartridge 10 by the hand members 40a, 40b as mentioned before, the lift-up section 44B-4 is disposed between the cam followers 43a, 43b through the drive of the hand opening and closing drive motor 45.

Whereupon, the lower cam follower 43b engages with the lift-up groove 44d so that the hand members 40a, 40b are forcibly lifted up in a state of gripping the cartridge 10, with the result that it is possible to surely and easily conduct the operations such as releasing from the engaged condition between the cartridge 10 and the lock member in the storage rack without upwardly driving the whole hand assembly 7a.

(6-1-3) Description of Third Cam Modification

Figure 29:
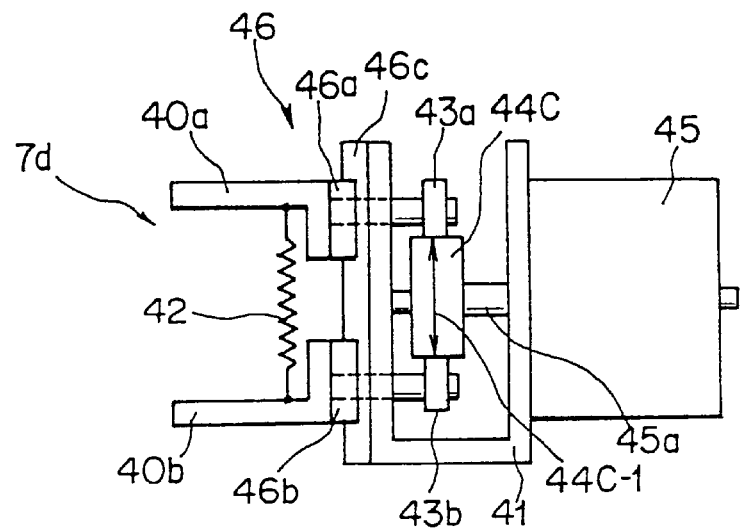
FIG. 29 is a side elevational view of a principal portion, illustratively showing a hand open condition of the hand mechanism including a cam of a third modification in this embodiment.
Figure 30:
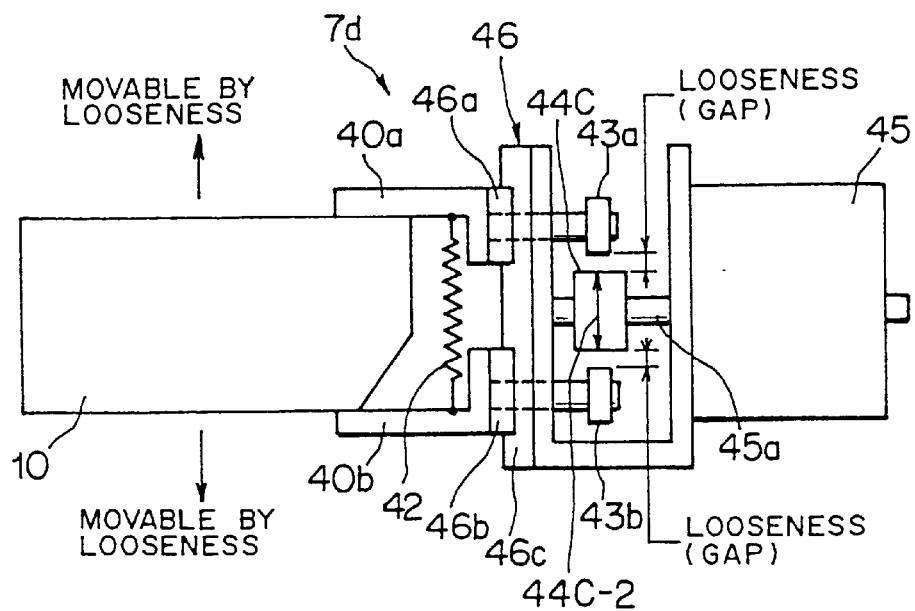
FIG. 30 is a side elevational view of a principal portion, illustratively showing a cartridge gripping condition of the hand mechanism including a cam of the third modification in this embodiment.

FIGS. 29 and 30 illustrate the hand mechanism 7d according to this embodiment which includes a cam 44C being a third modification, and are side elevational views of a principal portion, illustratively showing the hand open condition and the cartridge gripping condition. As shown in FIGS. 29 and 30, the cam 44C is of a single disc-like type unlike the above-described cams 44, 44A and 44B, and is also capable of offering the same effects as those of the foregoing cams.

The cam 44C is formed to have a hand opening section 44C-1 being a large-diameter ("high") portion and a cartridge gripping section 44C-2 with a buffer function being a small-diameter ("low") portion.

When the hand opening section 44C-1 is put between the cam followers 43a, 43b, as shown in FIG. 29, the separation between the cam followers 43a, 43b is adjusted so that the hand members 40a, 40b take the open condition against the biasing forces of the springs 42.

Furthermore, if the cartridge gripping section 44C-2 with the buffer function is located between the cam followers 43a, 43b, as shown in FIG. 30, a gap (looseness) appears between the cam 44C and each of the cam followers 43a, 43b, and in this state, the hand members 40a, 40b are driven due to the biasing forces of the springs 42 to come into the closed condition to grip the cartridge 10.

Still further, the hand opening and closing drive motor 45 is designed to forwardly/reversely drive the cam 44C to place one of the sections 44C-1 and 44C-2 in between the cam followers 43a, 43b.

According to the hand mechanism 7d using the cam 44C thus constructed, as well as the aforesaid cam 44, the opening and closing mechanism for the hand members 40a, 40b can be constructed to be extremely simple and compact, which contributes to the size and cost reduction of such a library apparatus 1 as shown in FIG. 2.

Moreover, when the cartridge gripping section (small-diameter portion) with the buffer function is set between the cam followers 43a, 43b, the looseness between the cam 44C and the cam followers 43a, 43b are positively utilized as a buffer to ensure the certain insertion of the cartridge 10 into the deck 5a, thereby eliminating the need for a cartridge delivering and receiving mechanism to be provided at every deck 5a to contribute to the size and cost reduction of the library apparatus 1.

Incidentally, if the cam 44C is shaped such that the separation between the cam followers 43a, 43b is adjustable in the stepless condition, only if an appropriate portion of the cam 44C is disposed between the cam followers 43a, 43b by the motor 45, the separation between the hand members 40a, 40b is adjustable to have an arbitrary open width.

(6-1-4) Description of Fourth Cam Modification

Figure 31:
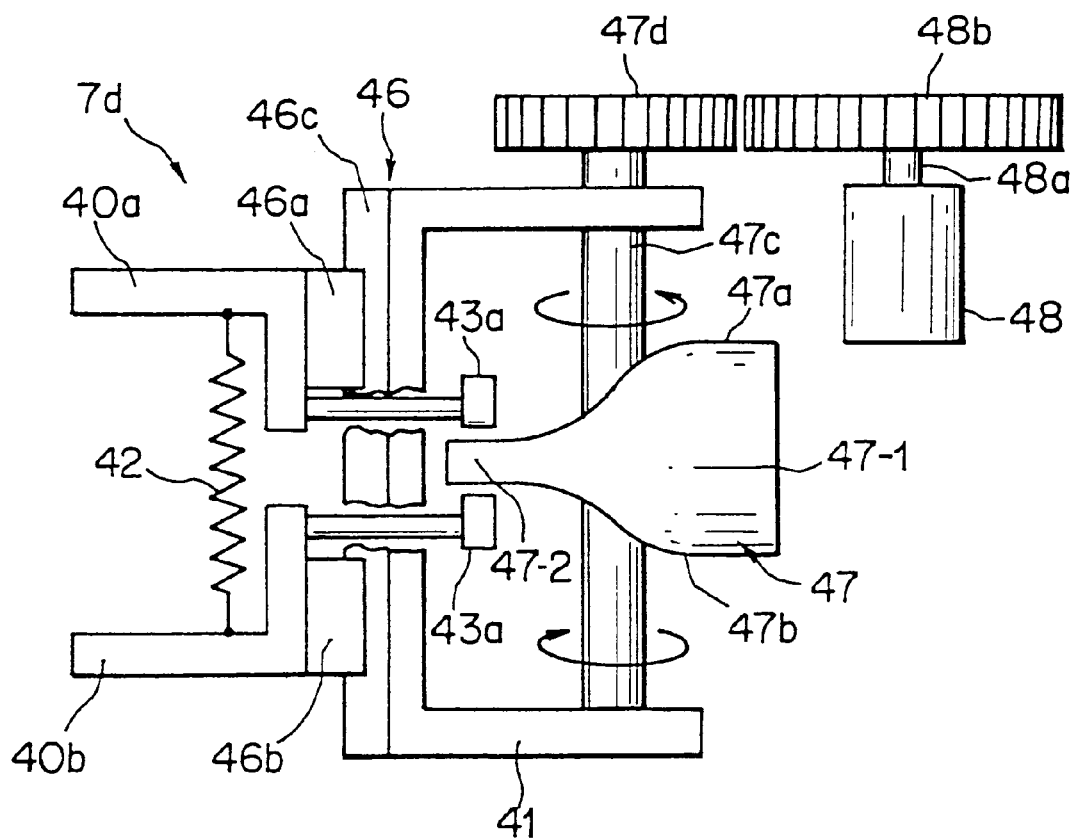
FIGS. 31 and 32 are respectively a partially broken side elevational view and perspective view illustratively showing a principal portion of the hand mechanism including a cam of a fourth modification in this embodiment.
Figure 32:
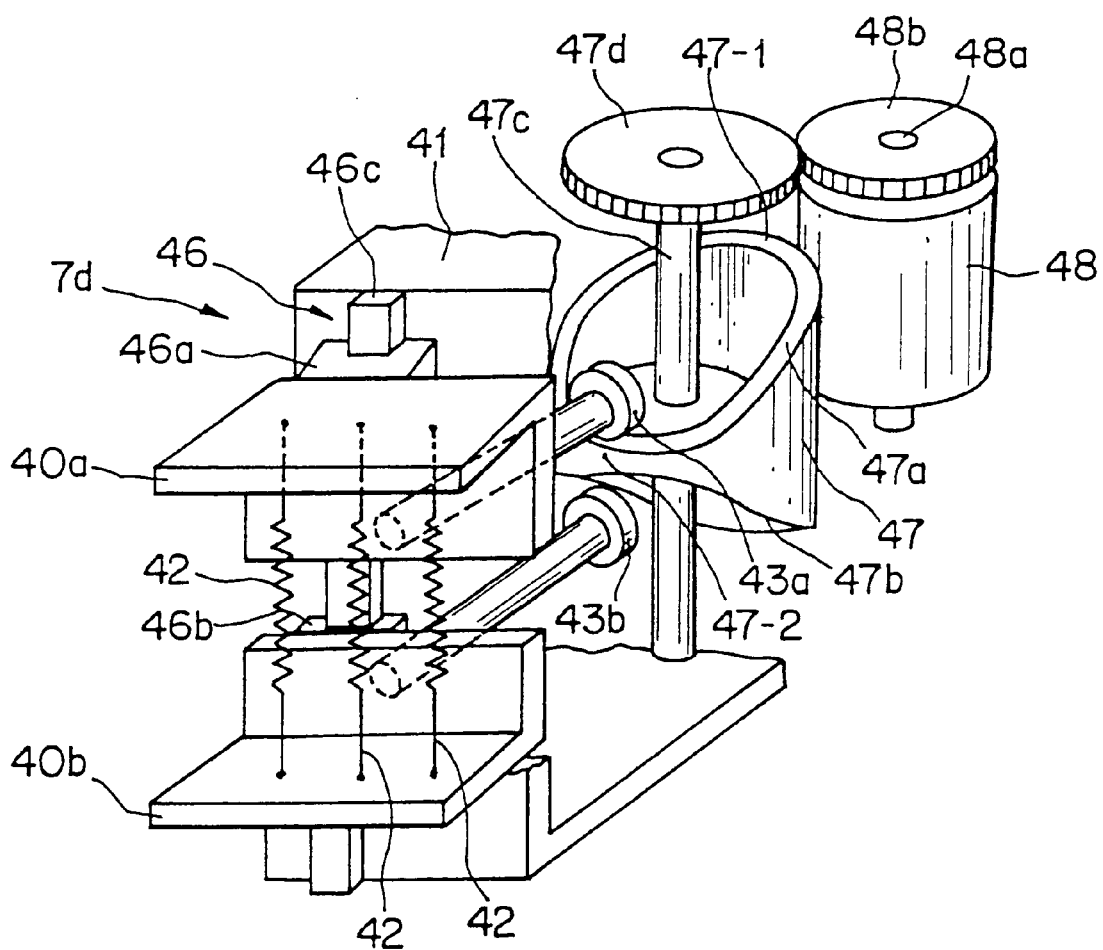

FIGS. 31 and 32 are respectively a partially broken side elevational and perspective views illustratively showing a principal portion of the hand mechanism 7d according to this embodiment which is equipped with a cam (cylindrical cam 47) according to a fourth modification. As shown in FIGS. 31 and 32, the cam 47 has a cylindrical configuration unlike the above-described cams 44 and 44A to 44C, which is also capable of offering the same effects as those mentioned above.

This cylindrical cam 47 is supported through a vertically installed rotary shaft 47c to be rotatable with respect to the hand base 41, and a gear 47d is coaxially coupled to the rotary shaft 47c. An upper circumferential surface 47a of the cylindrical cam 47 is placed into contact with an circumferential surface of the upper cam follower 43a to guide this cam follower 43a, whereas a lower circumferential surface of the cylindrical cam 47 is brought into contact with a circumferential surface of the lower cam follower 43b to guide this cam follower 43b.

In addition, a hand opening and closing drive motor (drive mechanism) 48 is provided to rotationally drive the cylindrical cam 47, and when a gear 48b coaxially connected to a rotating drive shaft 48a of this motor 48 is engaged with the gear 47d, the rotational driving force of the motor 48 is transmitted to the rotary shaft 47c so that the cylindrical cam 47 is rotationally driven around the vertical rotary shaft 47c.

Besides, the cylindrical cam 47 is formed to have a hand opening section 47-1 for providing a large separation and a cartridge gripping section 47-2 with a buffer function for creating a small separation so that the separation between the cam followers 43a, 43b is adjustable by the separation between the upper circumferential surface 47a and the lower circumferential surface 47b.

In the case that the hand opening section 47-1 is placed between the cam followers 43a, 43b, the separation between the cam followers 43a, 43b is adjusted so that the hand members 40a, 40b come into the open condition against the biasing forces of the springs 42.

On the other hand, if the cartridge gripping section 47-2 with the buffer function is located between the cam followers 43a, 43b, as shown in FIGS. 31 and 32, a gap (looseness) appears between the cylindrical cam 47 (the upper circumferential surface 47a, the lower circumferential surface 47b) and each of the cam followers 43a, 43b, and in this state, the hand members 40a, 40b assume the closed condition owing to the biasing forces of the springs 42 to grip the cartridge 10. In FIGS. 31 and 32, the cartridge 10 is omitted from the illustration.

Furthermore, the above-mentioned hand opening and closing drive motor 48 forwardly/reversely drives the cylindrical cam 47 to place one of the sections 47-1 and 47-2 in between the cam followers 43a, 43b.

According to the hand mechanism 7d including the cylindrical cam 47 thus constructed, it is possible to offer the same effects as those by the aforesaid cam 44C.

Since the cylindrical cam 47 shown in FIG. 31 or 32 is made so that the separation between the upper circumferential surface 47a and the lower circumferential surface 47b changes in the stepless condition, only if an adequate portion of the cylindrical cam 47 is placed between the cam followers 43a, 43b by the motor 48, the separation between the hand members 40a, 40b is adjustable to an arbitrary open width.

In addition, if the cylindrical cam 47 is formed to have the cam curves shown in FIGS. 24, 27 and 28, it is possible to obtain the same effects as those of the above-described cam 44, 44A or 44B.

(6-1-5) Description of Modification of Biasing Mechanism

Figure 33:
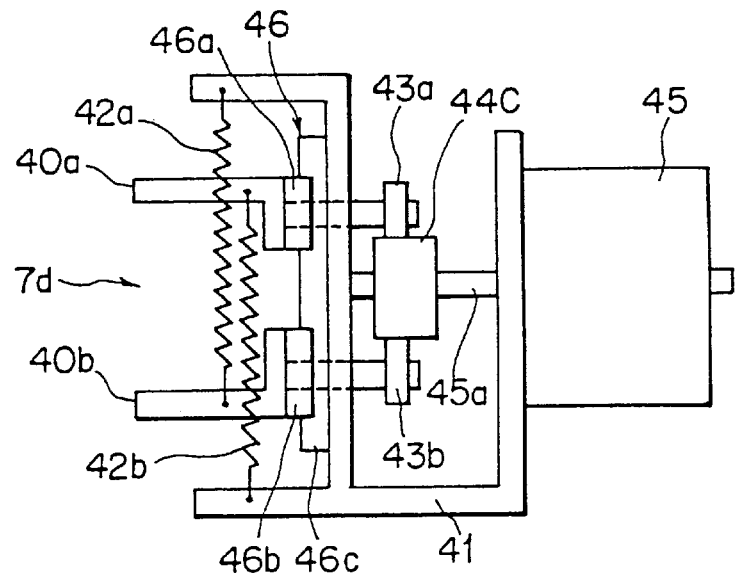
FIG. 33 is a side elevational view of a principal portion, illustratively showing a hand open condition of the hand mechanism in this embodiment, with the hand mechanism being equipped with a modified biasing mechanism to be described.
Figure 34:
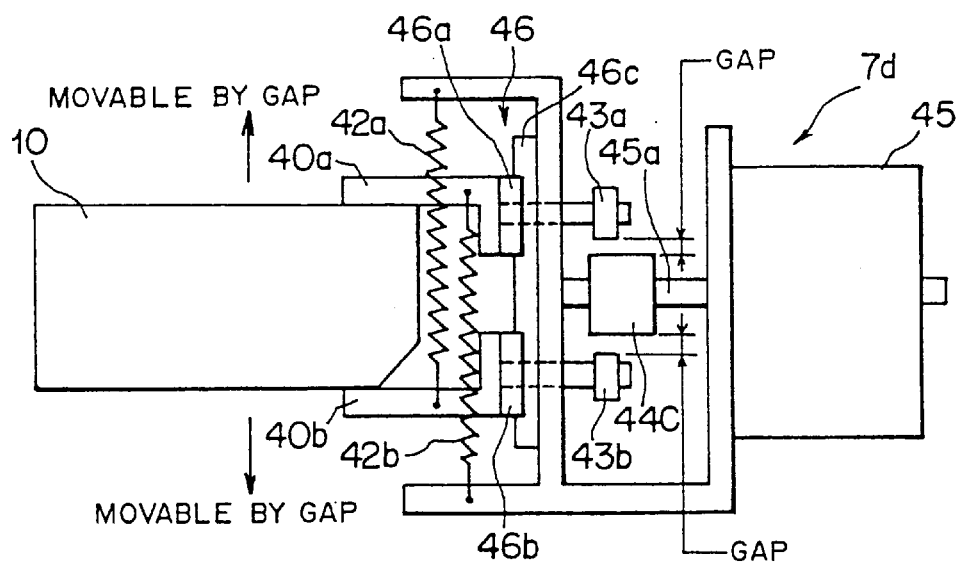
FIG. 34 is a side elevational view of a principal portion, illustratively showing a cartridge gripping condition of the hand mechanism in this embodiment, with the hand mechanism being equipped with the modified biasing mechanism to be described.

FIGS. 33 and 34 are illustrations available for describing a modification of the biasing mechanism of the hand mechanism 7d in this embodiment, and are side elevational views of a principal portion, illustratively showing the cases where the hand mechanism 7d including that biasing mechanism is in a hand open condition and in a cartridge gripping condition. The biasing mechanism shown in FIGS. 33 and 34 is made up of a first spring 42a and a second spring 42b instead of being constructed with the spring(s) 42 of the above-mentioned hand mechanism 7d.

The first spring 42a is for upwardly biasing the lower hand member 40b by being placed between the lower hand member 40b and the hand base 41, while the second spring 42b is for downwardly biasing the upper hand member 40a by being interposed between the upper hand member 40a and the hand base 41.

The hand mechanism 7d shown in FIGS. 33 and 34 is made to be similar in arrangement to the hand mechanism 7d having the cam 44C shown in FIGS. 29 and 30 except the biasing mechanism comprising the springs 42a, 42b.

In the hand mechanism 7d including the biasing force (springs 42a, 42b) thus arranged, as shown in FIG. 34, in the case that the cartridge gripping section (small-diameter portion) 44C-2 with a buffer function is disposed between the cam followers 43a, 43b so that a gap (looseness) occurs between the cam 44C and each of the cam followers 43a, 43b, due to the biasing forces of the first and second springs 42a, 42b, a cartridge 10 gripped by the hand mechanism 7d, together with the hand members 40a, 40b, is maintained at the substantially central portion of the vertical movement range resulting from the aforesaid gaps (looseness).

For this reason, in inserting the cartridge 10 into the deck 5a, the absorption of the positional slippage due to the gaps (looseness) is effectively and surely achievable.

Incidentally, in FIGS. 33 and 34, although the biasing mechanism comprising the first and second springs 42a, 42b is employed for the hand mechanism 7d using the cam 44C, the same biasing mechanism is also applicable to the hand mechanisms 7d employing the above-mentioned cams 44, 44A, 44B and cylindrical cam 47, which can offer the same effects.

(6-2) Description of Mounter Mechanism

Moreover, referring to FIGS. 35 to 41, a description will be made hereinbelow of a mounter mechanism 50 to be used for the hand mechanism 7d according to this embodiment.

Figure 35:
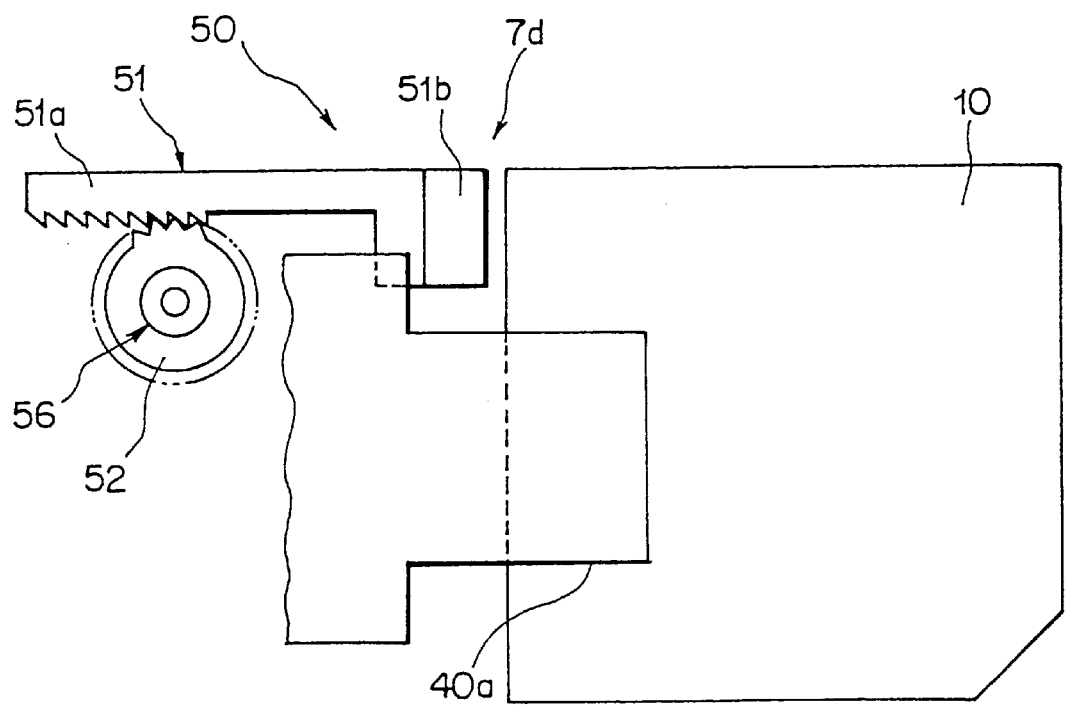
FIGS. 35 and 36 are respectively a plan view and a side elevational view showing a principal portion of a mounter mechanism of the hand mechanism in this embodiment.
Figure 36:
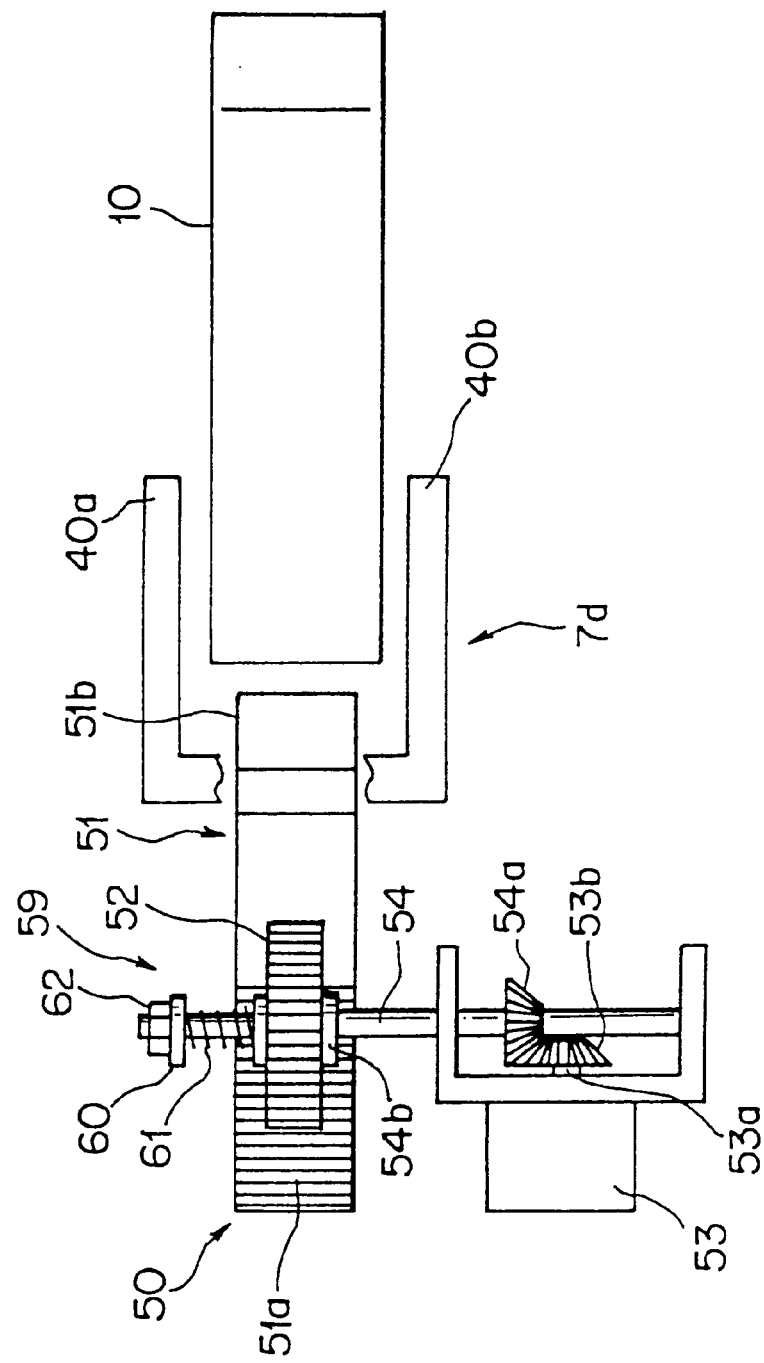

FIGS. 35 and 36 are respectively a plan view and a side elevational view showing a principal portion of the mounter mechanism 50. As shown in FIGS. 35 and 36, the hand mechanism 7d is equipped with the mounter mechanism 50 which serves to apply a pressing force to a cartridge 10 for the insertion of the cartridge 10 into the deck 5a.

In this embodiment, the mounter mechanism 50 comprises a mounter arm 51, a pinion 52, a mounter arm drive motor (rotational drive mechanism) 53, and a buffer mechanism 56.

The mounter arm 51 is designed to be movable to come into contact with a rear end surface of the cartridge 10, being gripped by the hand members 40a, 40b, and further to advance in a direction of pushing the cartridge 10 into the deck 5a, with its tip portion being equipped with a mounter 51b which is brought into contact with the rear end surface of the cartridge 10.

The pinion 52 is made to be geared with a rack 51a formed on the mounter arm 51, and is rotationally driven by the motor 53 to move the mounter arm 51 in the cartridge pushing direction. This pinion 52 is fitted through the buffer mechanism 56 to a rotary shaft 54 placed vertically.

A bevel gear 54a is coaxially attached to the rotary shaft 54, and when this bevel gear 54a is geared with a bevel gear 53b coaxially connected to a rotational drive shaft 53a of the motor 53, the rotational drive force from the motor 53 is transferred to the rotary shaft 54 so that the pinion 52 is rotationally driven around the vertical rotary shaft 54 through the buffer mechanism 56.

Figure 37:
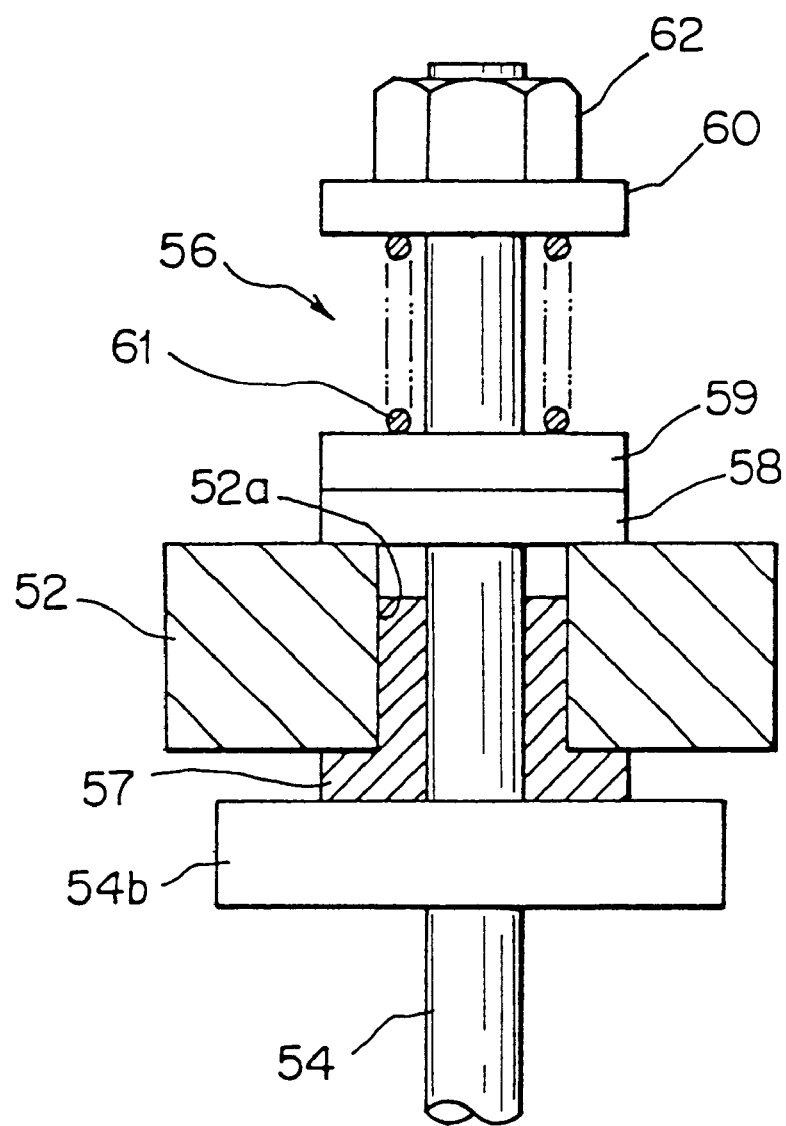
FIG. 37 is a cross-sectional view showing a detailed structure of a buffer mechanism of the mounter mechanism in this embodiment.

On the other hand, the buffer mechanism 56 is for the purpose of, when a pressing force exceeding a given load works on the cartridge 10, absorbing the extra pressing force, and, as shown in FIG. 37, is turned out by putting a resin-made bearing 57 or a resin-made spacer 58 in between the pinion 52 and the rotary shaft 54 connected to the drive shaft 53a of the motor 53. FIG. 37 is a cross-sectional view showing the detailed structure of the buffer mechanism 56.

More specifically, as shown in FIG. 37, a flange section 54b is built on the circumference of the rotary shaft 54 to protrude therefrom, and the pinion 52 has, at its central portion, a fitting hole 52a made to allow the penetration of the rotary shaft 54.

Furthermore, above the flange section 54b, a resin bearing 57 is put between the upper surface of the flange section 54b and the lower surface of the pinion 52 and between the outer circumferential surface of the rotary shaft 54 and the inner circumferential surface of the fitting hole 52a of the pinion 52, and in this state, the pinion 52 is fitted over the rotary shaft 54.

Still further, above the pinion 52, a resin spacer 58 is fitted over the rotary shaft 54 to be placed into contact with the upper surface of the pinion 52.

Moreover, spacers 59, 60 and a spring 61 are fitted on an upper end portion of the rotary shaft 54 above the resin spacer 58 and are clamped with a nut 62. The spacer 59 is placed into contact with the upper surface of the resin spacer 58, and in a state where the spring 61 is interposed between the spacer 59 and the spacer 60, the nut 62 is screw-fitted onto an upper end portion of the rotary shaft 54 from the upper surface side of the spacer 60. By adjusting the clamping quantity with respect to the upper end portion of the rotary shaft 54 by the nut 62, the frictional force (the aforesaid given load) occurring between the resin bearing 57/resin spacer 58 and the pinion 52 is adjustable.

Figure 38A:
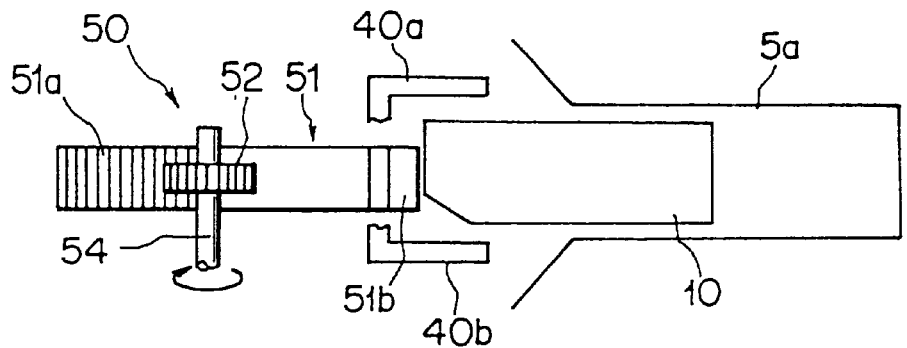
FIGS. 38A to 38C are side elevational views illustratively showing a principal portion of the mounter mechanism for explaining an operation of the mounter mechanism in this embodiment.
Figure 38B:
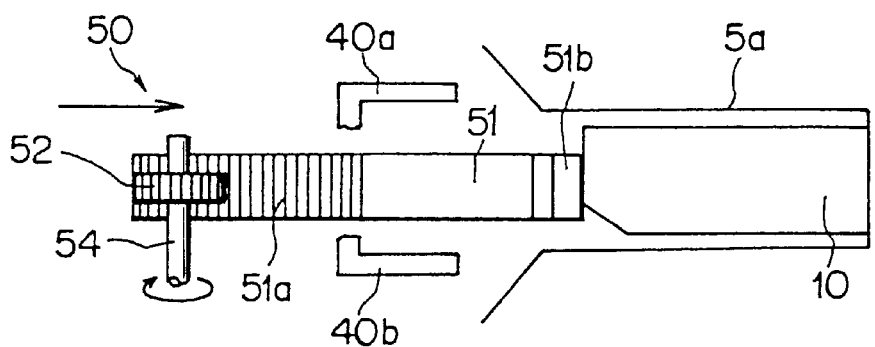
Figure 38C:
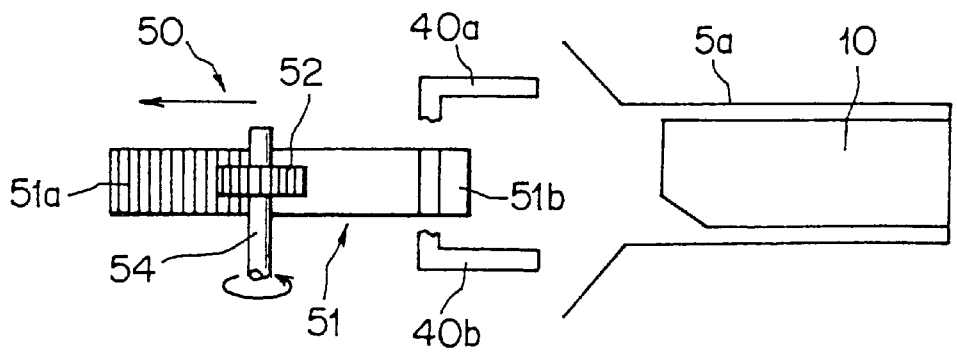

Referring now to FIGS. 38A to 38C, a description will be made hereinbelow of an operation of the mounter mechanism 50 thus arranged. FIGS. 38A to 38C are side elevational views illustratively showing a principal portion of the mounter mechanism 50.

In inserting the cartridge 10 into the deck 5a, after the cartridge 10 is transferred up to the cartridge insertion opening of the deck 5a while being gripped by the hand members 40a, 40b and subsequently released from the gripping by the hand members 40a, 40b, the pinion 52 is forwardly driven by the motor 53, so that as shown in FIG. 38A the mounter arm 51 is shifted in the cartridge pushing direction (the right-hand direction in the illustration) through the pinion 52 and the rack 51a engaging with the pinion 52.

Whereupon, as shown in FIG. 38B, the cartridge 10 is inserted into the depth of the deck 5a while being pressed by the mounter 51b of the mounter arm 51. In this embodiment, when a pressing force above a given load is brought to bear on the cartridge 10, the buffer mechanism 56 placed between the pinion 52 and the motor 53 side drive shaft absorbs the extra pressing force.

In more detail, in the buffer mechanism 56, slip occurs through the resin bearing 57 or the resin spacer 58 between the pinion 52 and the rotary shaft 54, and the frictional force occurring at that time absorbs the extra pressing force. Accordingly, the transfer of the force from the mounter arm 51 to the cartridge 10 becomes impossible, thus preventing the excessive force from working on the cartridge 10.

Thus, through the use of the above-mentioned buffer mechanism 56, the mounter arm 51 can always continue to press the cartridge 10 at a constant force, and even in case that any trouble arises to cause an excessive load from the mounter mechanism 50 to bear on the cartridge 10, it is possible to protect not only the cartridge 10 and its peripheral sections but also the mounter mechanism 50, the drive system (the motor 53 and others) therefor and others therefrom.

The given load whereby the pinion 52 starts to slip with respect to the rotary shaft 54 can be set by, as mentioned above, adjusting the clamping quantity to the upper end portion of the rotary shaft 54 by the nut 62 to adjusting the frictional force between the resin bearing 57/resin spacer 58 and the pinion 52.

Furthermore, after the cartridge 10 is inserted into the depth of the deck 5a, the pinion 52 is reversely driven by the motor 53 so that, as shown in FIG. 38C, the mounter arm 51 is drawn toward the hand mechanism 7d side (the left side in the illustration) by the pinion 52 and the rack 51a geared with the pinion 52.

The hand mechanism 7d (accessor 7) of this embodiment having the mounter mechanism 50 thus constructed permits the cartridge 10 to be certainly inserted into the depth of the deck 5a and, hence, eliminate the need for a cartridge delivering and receiving mechanism to be provided at every deck 5a, which contributes to the size and cost reduction of the library apparatus 1.

Figure 39:
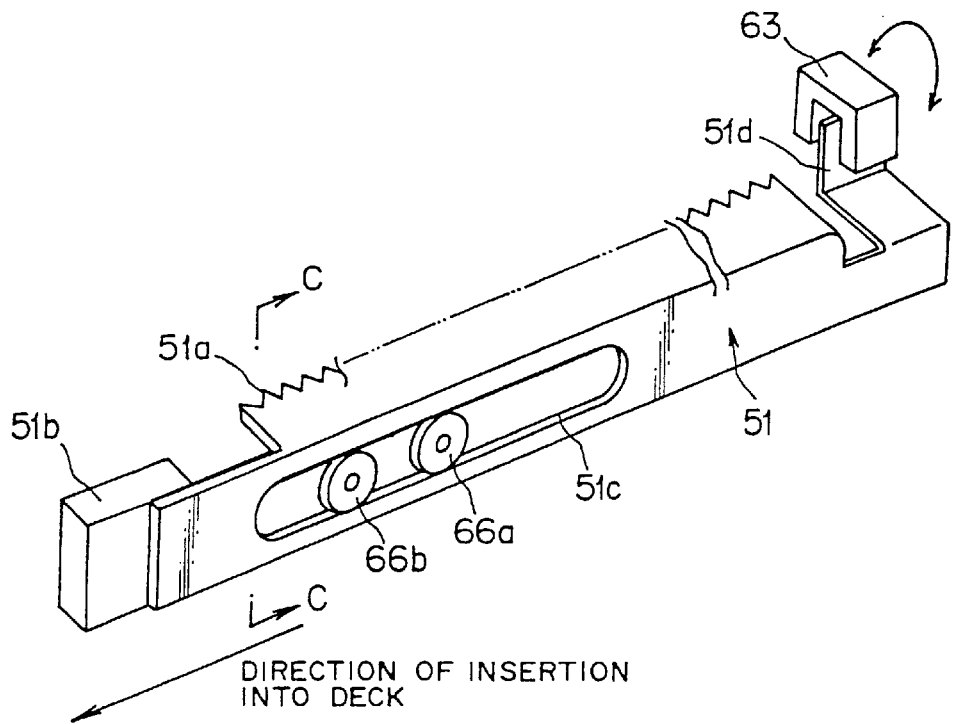
FIG. 39 is a perspective view showing a mounter arm guide structure of the mounter mechanism in this embodiment.
Figure 40:
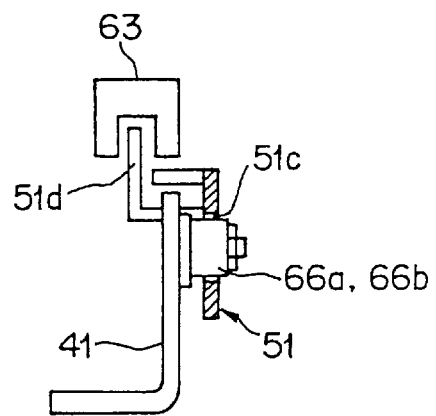
FIG. 40 is a cross-sectional view taken along a line C—C in FIG. 39.
Figure 41:
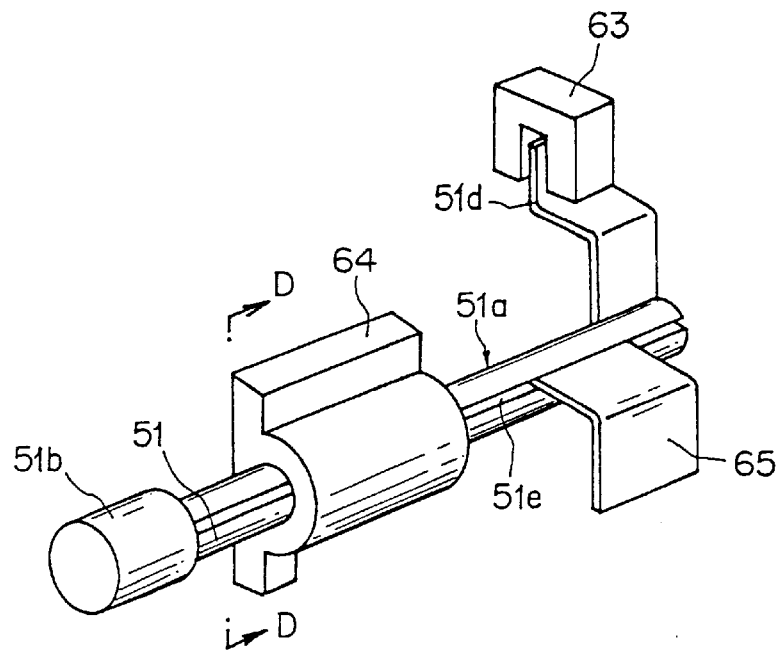
FIG. 41 is a perspective view showing another example of the mounter arm guide structure of the mounter mechanism in this embodiment.
Figure 42:
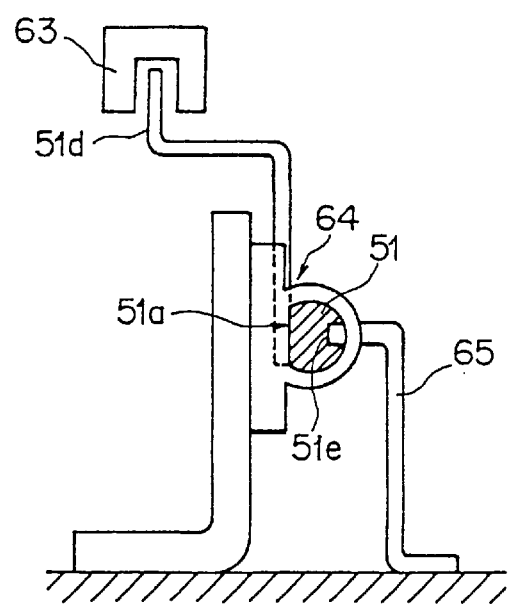
FIG. 42 is a cross-sectional view taken along a line D—D in FIG. 41.

Referring to FIGS. 39 to 41, a description will be taken hereinbelow of one example of guide structures of the mounter arm 51 of the mounter mechanism 50. FIG. 39 is a perspective view showing the guide structure example, FIG. 40 is a cross-sectional view taken along a line C—C of FIG. 39, FIG. 41 is a perspective view showing another guide structure example, and FIG. 42 is a cross-sectional view taken along a line D—D of FIG. 41.

In the guide structure shown in FIGS. 39 and 40, an elliptic or elongated hole 51c is made along the longitudinal directions of the mounter arm 51, and a pair of front and rear rollers 66a, 66b are fitted in this elliptic hole 51c. Whereupon, the mounter arm 51 can straightforwardly be moved while being guided in the forward and backward directions (the longitudinal directions). The rollers 66a, 66b are pivotally fitted to the hand base 41 side as shown in FIG. 40.

The mounter arm 51 is made, for example, from a sheet metal, and is integrally equipped with a sensor flag 51d which is used for detecting the position of the mounter arm 51 in the forward and backward directions (the longitudinal directions). This sensor flag 51d operates a sensor 63, thereby detecting the position of the mounter arm 51. For instance, the sensor 63 is a photosensor, and carries out the detecting operation when the sensor flag 51d passes through between light-emitting and light-receiving devices of the sensor 63 to intercept the light from the light-emitting device.

At this time, gaps tend to occur between the elliptic hole 51c and the rollers 66a, 66b, and hence, a looseness develops due to the gaps, wit the result that there is a possibility of impairing the smooth straight movements of the mounter arm 51. In such a case, the position of the sensor flag 51d varies because of the looseness so that the sensor flag 51d and the sensor 63 can interfere with each other.

For this reason, it is also appropriate to employ the guide structure shown in FIGS. 41 and 42. In the case of this guide structure, the mounter arm 51 is constructed to be a rod-like solid-core member, and is supported by a bush 64 on the hand base 41 to be movable in the direction (the longitudinal direction of the mounter arm 51) of pushing the cartridge 10 into the deck 5a. The bush 64 can be of an oil-retaining type.

In addition, a looseness controlling groove 51e is made in a side surface of the mounter arm 51 along its longitudinal directions, while a looseness controlling metallic member 65 is installed to be fitted in the looseness controlling groove 51e to guide the mounter arm 51 in the longitudinal directions.

In the guide structure thus made, the bush 64 can not only support and guide the mounter arm 51 without allowing the occurrence of the looseness, but also ensure the smooth straight movement of the mounter arm 51, for that the mounter arm 51 moves while the looseness controlling metallic member 65 is fitted in the looseness controlling groove 51e. Accordingly, it is possible to surely prevent troubles, for example, to prevent the sensor flag 51d and sensor 63 attached to the mounter mechanism 50 from interfering with each other. In this case, if the bush 64 used is of the oil-retaining type, the straight movements of the mounter arm 51 are more smoothly achievable.

(6-3) Description of CIP/CSP Unit

Lastly, referring to FIGS. 43A to 43C and 44A to 44C, a description will be taken hereinbelow of a CIP/CSP unit 70 of the hand mechanism 7d in this embodiment.

Figure 43A:
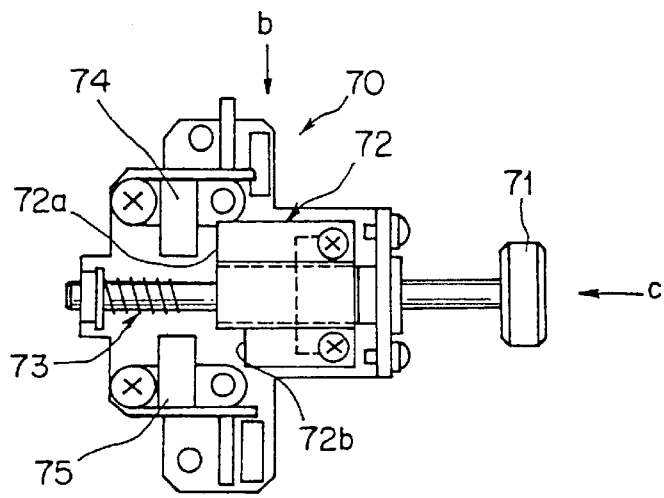
FIGS. 43A to 43C are illustrations of a CIP/CSP unit of the hand mechanism in this embodiment, FIG. 43A being a side elevational view of the CIP/CSP unit, FIG. 43B being an illustration of a portion indicated by an arrow b in FIG. 43A, and FIG. 43C being an illustration of a portion indicated by an arrow c in FIG. 43A.
Figure 43B:
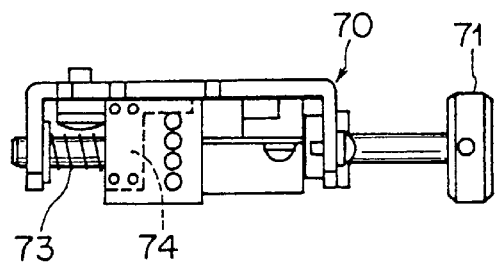
Figure 43C:
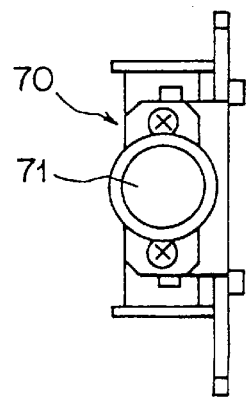

FIGS. 43A to 43C are illustrations of the CIP/CSP unit 70, and of these drawings, FIG. 43A is a side elevational view thereof, FIG. 43B is an illustration of a portion indicated by an arrow b in FIG. 43A, and FIG. 43C is an illustration of a portion indicated by an arrow c in FIG. 43A.

As also shown in FIGS. 15 to 20, the hand mechanism 7d according to this embodiment is provided with the CIP/CSP (Cartridge In Picker/Cartridge Secured Position) unit 70.

As shown in FIGS. 43A to 43C, this CIP/CSP unit 70 is composed of an actuator 71, a flag 72, a spring 73, a CIP sensor (first sensor) 74 and a CSP sensor (second sensor) 75.

The CIP sensor 74 is for detecting the fact that a cartridge 10 is inserted into between the hand members 40a, 40b, while the CSP sensor 75 is for detecting the fact that an rear end surface of the cartridge 10 reaches a given position after the CIP sensor 74 detects the insertion of the cartridge 10 therebetween.

The flag 72 is formed to have a first edge 72a and a second edge 72b for actuating the CIP sensor 74 and the CSP sensor 75, and is made to be driven in the backward direction (the left-hand side in FIGS. 43A and 43B) through the actuator 71.

Although the CIP sensor 74 and the CSP sensor 75 are disposed at the same position in the forward and backward directions, in the flag 72, the first edge 72a is formed on a little further rear side (approximately 3 mm) with respect to the second edge 72b. Thus, the CIP sensor 74 is put into operation before the CSP sensor 75 is done.

In more detail, each of the CIP sensor 74 and the CSP sensor 75 comprises a photosensor, and when the first and second edges 72a, 72b of the flag 72 respectively pass through between the light-emitting device and light-receiving device of the CIP sensor 74 and between the light-emitting device and light-receiving device of the CSP sensor 75 to intercept the lights from the light-emitting devices, the CIP sensor 74 and the CSP sensor 75 are put into the detecting operations.

Concretely, the CIP sensor 74 and the CSP sensor 75 detect the condition that the cartridge 10 is placed between the hand members 40a, 40b and the condition that the cartridge 10 is surely held by the hand members 40a, 40b, respectively.

Figure 44A:
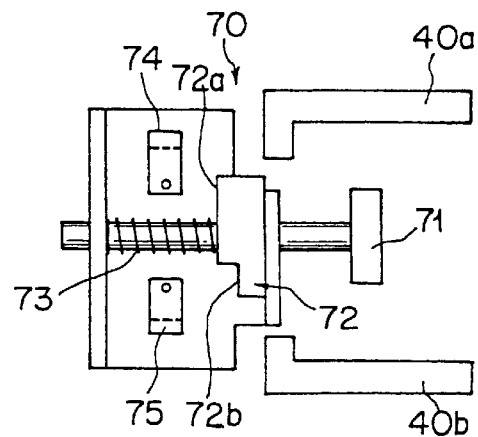
FIGS. 44A to 44C are side elevational views illustratively showing the CIP/CSP unit for describing an operation of the CIP/CSP unit in this embodiment.
Figure 44B:
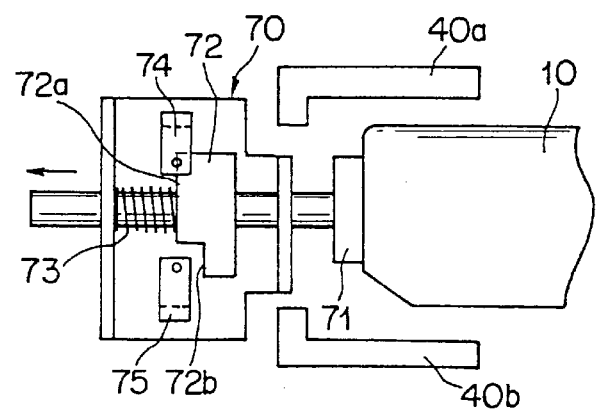
Figure 44C:
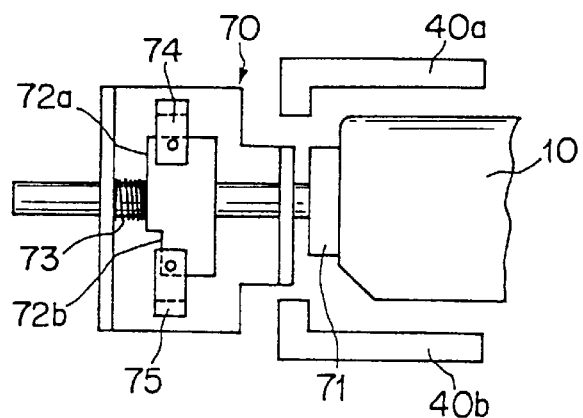

Furthermore, the actuator 71 is biased in the forward direction (the right-hand direction in FIGS. 43A and 43B) by the spring 73, and when the cartridge 10 comes to between the hand members 40a, 40b, as shown in FIGS. 44B and 44C, it is brought into contact with the rear end surface of the cartridge 10 and pressed against the biasing force of the spring 73 to operate the flag 72, so that the CIP sensor 74 and the CSP sensor 75 successively come into actuation.

Referring to FIGS. 44A to 44C, a description will be made hereinbelow of an operation of the CIP/CSP unit 70 thus arranged. FIGS. 44A to 44C are side elevational views illustratively showing the CIP/CSP unit 70.

In a state where the cartridge 10 does not exist between the hand members 40a, 40b, as shown in FIG. 44A, the flag 72 is biased by the spring 73 in the forward direction (the right-hand direction in the illustration), so that both the CIP sensor 74 and CSP sensor 75 are in the off conditions.

When the hand mechanism 7d is advanced in order to grip the cartridge 10 and the rear end portion of the cartridge 10 come in between the hand members 40a, 40b, as shown in FIG. 44B, the actuator 71 is first brought into contact with the rear end surface of the cartridge 10 to be pressed so that the CIP sensor 74 gets into the on condition owing to the operation of the first edge 72a. This on condition of the CIP sensor 74 makes sure that the cartridge 10 exists between the hand members 40a, 40b.

If the hand mechanism 7d further advances to cause the rear end portion of the cartridge 10 to enter the further depth, as shown in FIG. 44C, the CSP sensor 75 comes into the on condition due to the second edge 72b.

Thus, in a state where the detection result of the CIP sensor 74 guarantees that the cartridge 10 stands between the hand members 40a, 40b, the CSP sensor 75 can sensitively sense the fact that the rear end surface of the cartridge 10 reaches a given position.

Accordingly, the position of the cartridge 10 with respect to the hand members 40a, 40b is assured, with the result that the cartridge 10 discharged from the deck 5a or the cartridge 10 existing within the storage rack can certainly be caught by the hand mechanism 7d in a state of always taking the same positional relation with respect to the hand members 40a, 40b. Whereupon, it is possible to prevent the hand members 40a, 40b from shallowly gripping the cartridge 10 or to prevent the cartridge 10 from being again inserted into the deck 5a by mistake at the time when the hand members 40a, 40b come to grip the cartridge 10.

By providing multiple functions to the hand mechanism 7d as described above with reference to FIGS. 1 and 15 to 44C, it becomes possible to directly carry out the insertion/extraction of the cartridge 10 between the deck 5a and the hand mechanism 7d without using a cartridge delivering and receiving mechanism therebetween, which not only realizes the size and cost reduction of a library apparatus 1, but also realizes a library apparatus 1 in which a plurality of types of cartridges exist by mixture.

So far, the installation of a cartridge delivering and receiving mechanism at every deck has been known as one of factors to increase the manufacturing cost of the library apparatus. That is, the delivering and receiving mechanisms dedicated to decks are required to be installed by number corresponding to the number of the decks, and the delivering and receiving mechanisms cause the increase in the manufacturing cost. In addition, a deck dedicated to the library apparatus becomes necessary, which inhibits a single mechanism (deck) from being applied to some other purpose.

On the other hand, in the case of the above-described library apparatus 1 according to this embodiment, the insertion of the cartridge 10 into the deck 5a is assured even if a positional slippage slightly occurs between the cartridge insertion opening of the deck 5a and the cartridge 10 gripped by the hand mechanism 7d of the accessor 7, and the sure insertion of the cartridge 10 into the depth of the deck 5a is feasible without the installation of the cartridge delivering and receiving mechanism, and further the cartridge 10 discharged from the deck 5a can certainly be gripped by the hand mechanism 7d of the accessor 7. Accordingly, although a deck 5a being a single mechanism is mounted on the library apparatus 1, the accessor 7 can surely and directly perform the insertion/extraction of the cartridge 10 without the need of the installation of the cartridge delivering and receiving mechanism therebetween.

Moreover, although the prior accessor can treat only one type of cartridges and the prior library apparatus conducts large-capacity back-up processing of data through the use of the one type of cartridges, and hence, naturally, the prior accessor is only needed to have the function to transfer one type of cartridges. For this reason, in the case of using the prior accessor, it is impossible to realize a library apparatus in which different types of cartridges exist by mixture. Thus, it is impossible to meet the above-mentioned requirements.

Contrary to this, according to this embodiment, the hand mechanism 7d of the accessor 7 can grip cartridges 10 with various configurations without any restriction like the human hands and can perform the insertion/extraction of the cartridges 10 into/from the deck 5a or the storage rack, which realizes lower manufacturing cost of the library apparatus.

In addition, if employing the accessor 7 according to this embodiment, the library apparatus 1 permits data to be stored through the use of not only one type of medium but also two or more types of media (cartridges), with the result that the back-up of a large volume of data is surely possible.

It should be understood that the present invention is not limited to the above-described embodiments, and that it is intended to cover all changes and modifications of the embodiments of the invention herein used for the purpose of the disclosure, which do not constitute departures from the spirit and scope of the invention.

What is claimed is:

1. A cartridge transferring robot for use in a library apparatus including a storage rack for storing cartridges each accommodating a storage medium, a cartridge entry/exit station for entry/exit of said cartridge, and a deck for carrying out access to said storage medium within said cartridge, said cartridge transferring robot comprising a picker section including a hand mechanism for gripping said cartridge for insertion and extraction of said cartridge at cartridge conveyance within said library apparatus and a moving mechanism for moving said picker section up to a given position, said hand mechanism including:

a pair of upper and lower hand members made to vertically come into contact with said cartridge to grip said cartridge;

a hand base to which said pair of upper and lower hand members are fitted to be vertically slidable;

a biasing mechanism for biasing said pair of upper and lower hand members in closing directions of gripping said cartridge;

a pair of upper and lower cam followers attached to said pair of upper and lower hand members, respectively;

a cam placed between said pair of upper and lower cam followers for adjusting a separation between said pair of upper and lower cam followers to cause said pair of upper and lower hand members to take opening and closing actions against a biasing force of said biasing mechanism; and a drive mechanism for rotationally driving said cam.

2. A cartridge transferring robot for use in a library apparatus as defined in claim 1, wherein said cam has:

a cartridge gripping section for adjusting said separation between said pair of upper and lower cam followers so that said pair of upper and lower hand members take a closed condition due to said biasing force of said biasing mechanism; and two or more hand opening sections for adjusting said separation between said pair of upper and lower cam followers so that said pair of upper and lower hand members take open conditions with different separations therebetween against said biasing force of said biasing mechanism, and said drive mechanism rotationally drives said cam so that one of said cartridge gripping section and said two or more hand opening sections is placed between said pair of upper and lower cam followers.

3. A cartridge transferring robot for use in a library apparatus as defined in claim 1, wherein said cam has:

a cartridge gripping section with a buffer function for defining a gap between said cam and each of said pair of upper and lower cam followers so that said pair of upper and lower hand members take a closed condition due to said biasing force of said biasing mechanism; and a hand opening section for adjusting said separation between said pair of upper and lower cam followers so that said pair of upper and lower hand members take an open condition against said biasing force of said biasing mechanism, and said drive mechanism rotationally drives said cam so that one of said cartridge gripping section with said buffer function and said hand opening section is placed between said pair of upper and lower cam followers.

4. A cartridge transferring robot for use in a library apparatus as defined in claim 3, wherein said cam has, as a lock section, a lock groove which allows said lower cam follower to be fitted therein so that said pair of upper and lower hand members are fixed to said hand base in a state of gripping said cartridge, and said drive mechanism rotationally drives said cam so that one of said cartridge gripping section with said buffer function, said hand opening section and said lock section is placed between said pair of upper and lower cam followers.

5. A cartridge transferring robot for use in a library apparatus as defined in claim 4, wherein said cam has, as a lift-up section, a lift-up groove which allows said lower cam follower to be fitted therein so that said pair of upper and lower hand members are forcibly lifted up in a state of gripping said cartridge, and said drive mechanism rotationally drives said cam so that one of said cartridge gripping section with said buffer function, said hand opening section, said lock section and said lift-up section is placed between said pair of upper and lower cam followers.

6. A cartridge transferring robot for use in a library apparatus as defined in claim 3, wherein said biasing mechanism includes:

a first spring located between said lower hand member and said hand base for upwardly biasing said lower hand member; and a second spring located between said upper hand member and said hand base for downwardly biasing said upper hand member.

7. A cartridge transferring robot for use in a library apparatus including a storage rack for storing cartridges each accommodating a storage medium, a cartridge entry/exit station for entry/exit of said cartridge, and a deck for carrying out access to said storage medium within said cartridge, said cartridge transferring robot comprising a picker section including a hand mechanism for gripping said cartridge for insertion and extraction of said cartridge at cartridge conveyance within said library apparatus and a moving mechanism for moving said picker section up to a given position, said hand mechanism being equipped with a mounter mechanism for applying a pressing force to said cartridge to insert said cartridge into said deck, and said mounter mechanism including:

a mounter arm placed to be movable in a direction of coming into contact with an end surface of said cartridge to push said cartridge into said deck;

a pinion made to engage with a rack formed on said mounter arm; and a rotational drive mechanism for rotating said pinion to move said mounter arm in said direction.

8. A cartridge transferring robot for use in a library apparatus as defined in claim 7, wherein said mounter mechanism includes a buffer mechanism which, when a pressing force exceeding a given load works on said cartridge, absorbs its extra pressing force.

9. A cartridge transferring robot for use in a library apparatus as defined in claim 8, wherein said buffer mechanism is constructed by interposing one of a resin-made bearing and a resin-made spacer between said pinion and a drive shaft on the rotational drive mechanism side.

10. A cartridge transferring robot for use in a library apparatus as defined in claim 7, wherein said mounter mechanism further includes a bush for supporting said mounter arm so that said mounter arm is movable in a direction of pushing said cartridge into said deck.

11. A cartridge transferring robot for use in a library apparatus as defined in claim 10, wherein said bush is of an oil-retaining type.

12. A cartridge transferring robot for use in a library apparatus as defined in claim 10, wherein said mounter arm has a looseness controlling groove made along said direction, and a looseness controlling metallic member is provided to be fitted in said looseness controlling groove to guide said mounter arm.

13. A cartridge transferring robot for use in a library apparatus including a storage rack for storing cartridges each accommodating a storage medium, a cartridge entry/exit station for entry/exit of said cartridge, and a deck for carrying out access to said storage medium within said cartridge, said cartridge transferring robot comprising a picker section including a hand mechanism for gripping said cartridge for insertion and extraction of said cartridge at cartridge conveyance within said library apparatus and a moving mechanism for moving said picker section up to a given position, and said cartridge transferring robot further comprising:
- a first sensor for detecting the fact that said cartridge is inserted into between a pair of upper and lower hand members constituting said hand mechanism; and
- a second sensor for detecting the fact that an end surface of said cartridge reaches a given position after said first sensor detects the insertion of said cartridge.

14. A library apparatus comprising:
a storage rack for storing cartridges each accommodating a storage medium;
a cartridge entry/exit station for entry/exit of said cartridge;
a deck for carrying out access to said storage medium within said cartridge; and
a cartridge transferring robot including a picker section having a hand mechanism for gripping said cartridge for insertion/extraction of said cartridge and a moving mechanism for moving said picker section to a given position, to transfer said cartridge among said storage rack, said cartridge entry/exit station and said deck,
said hand mechanism of said cartridge transferring robot including:
- a pair of upper and lower hand members made to vertically come into contact with said cartridge to grip said cartridge;
- a hand base to which said pair of upper and lower hand members are fitted to be vertically slidable;
- a biasing mechanism for biasing said pair of upper and lower hand members in closing directions of gripping said cartridge;
- a pair of upper and lower cam followers attached to said pair of upper and lower hand members, respectively;
- a cam placed between said pair of upper and lower cam followers for adjusting a separation between said pair of upper and lower cam followers to cause said pair of upper and lower hand members to take opening and closing actions against a biasing force of said biasing mechanism; and
- a drive mechanism for rotationally driving said cam.

15. A library apparatus comprising:
a storage rack for storing cartridges each accommodating a storage medium;
a cartridge entry/exit station for entry/exit of said cartridge;
a deck for carrying out access to said storage medium within said cartridge; and
a cartridge transferring robot including a picker section having a hand mechanism for gripping said cartridge for insertion/extraction of said cartridge and a moving mechanism for moving said picker section to a given position, to transfer said cartridge among said storage rack, said cartridge entry/exit station and said deck,
wherein said hand mechanism of said cartridge transferring robot includes a mounter mechanism for applying a pressing force to said cartridge to insert said cartridge into said deck, and said mounter mechanism comprises:
- a mounter arm placed to be movable in a direction of coming into contact with an end surface of said cartridge to push said cartridge into said deck;
- a pinion made to engage with a rack formed on said mounter arm; and
- a rotational drive mechanism for rotating said pinion to move said mounter arm in said direction.

16. A library apparatus comprising:
a storage rack for storing cartridges each accommodating a storage medium;
a cartridge entry/exit station for entry/exit of said cartridge;
a deck for carrying out access to said storage medium within said cartridge; and
a cartridge transferring robot including a picker section having a hand mechanism for gripping said cartridge for insertion/extraction of said cartridge and a moving mechanism for moving said picker section to a given position, to transfer said cartridge among said storage rack, said cartridge entry/exit station and said deck,
wherein said cartridge transferring robot includes:
- a first sensor for detecting the fact that said cartridge is inserted into between a pair of upper and lower hand members constituting said hand mechanism; and
- a second sensor for detecting the fact that an end surface of said cartridge reaches a given position after said first sensor detects the insertion of said cartridge.

* * * * *